US008886993B2

(12) United States Patent
Nakayama et al.

(10) Patent No.: US 8,886,993 B2
(45) Date of Patent: Nov. 11, 2014

(54) STORAGE DEVICE REPLACEMENT METHOD, AND STORAGE SUB-SYSTEM ADOPTING STORAGE DEVICE REPLACEMENT METHOD

(75) Inventors: Yosuke Nakayama, Odawara (JP); Hiroshi Suzuki, Sagamihara (JP); Tetsuya Inoue, Odawara (JP); Takakatsu Mizumura, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 339 days.

(21) Appl. No.: 13/392,993

(22) PCT Filed: Feb. 10, 2012

(86) PCT No.: PCT/JP2012/000906
§ 371 (c)(1),
(2), (4) Date: Feb. 28, 2012

(87) PCT Pub. No.: WO2013/118189
PCT Pub. Date: Aug. 15, 2013

(65) Prior Publication Data
US 2013/0212429 A1    Aug. 15, 2013

(51) Int. Cl.
*G06F 11/00* (2006.01)
(52) U.S. Cl.
USPC .......................................................... 714/6.3
(58) Field of Classification Search
CPC . G06F 11/2033; G06F 11/2048; G06F 1/187; G06F 3/0652; G06F 3/0676
See application file for complete search history.

(56) References Cited

U.S. PATENT DOCUMENTS

| | | | |
|---|---|---|---|
| 6,041,421 A * | 3/2000 | Yamamoto | 714/6.32 |
| 7,502,955 B2 | 3/2009 | Ishikawa et al. | |
| 8,140,625 B2 * | 3/2012 | Dubnicki et al. | 709/205 |
| 2007/0192557 A1 | 8/2007 | Kezuka et al. | |
| 2008/0028107 A1 | 1/2008 | Cherian et al. | |
| 2008/0028141 A1 | 1/2008 | Kalos et al. | |
| 2008/0034249 A1 * | 2/2008 | Husain et al. | 714/3 |
| 2009/0210619 A1 | 8/2009 | Mukker et al. | |
| 2011/0161612 A1 * | 6/2011 | Kurokawa | 711/163 |

FOREIGN PATENT DOCUMENTS

| | | |
|---|---|---|
| EP | 2 325 775 A1 | 5/2011 |
| JP | 2007-087039 | 4/2007 |

OTHER PUBLICATIONS

PCT International Search Report and Written Opinion on application PCT/JP2012/000906 mailed Mar. 5, 2013; 11 pages.

* cited by examiner

*Primary Examiner* — Charles Ehne
(74) *Attorney, Agent, or Firm* — Foley & Lardner LLP

(57) ABSTRACT

Based on information security rules, it is not possible to take out a failure HDD to the exterior of a facility for replacement without erasing data therefrom. According to the present storage sub-system, a slot in which failure has occurred and a slot not registered to a configuration information of a storage sub-system are used to simultaneously perform correction copy to a spare HDD and data erase of the failure HDD in parallel, so as to enable the failure HDD to be brought out to the exterior of the storage facility. Further, time required from when failure has occurred to the HDD to data recovery is shortened, so as to prevent deteriorated redundancy that may be caused by another failure occurring during data recovery and to reduce the risk of data loss.

13 Claims, 19 Drawing Sheets

Fig. 3B

| | Unit 1 (5011) | | | Unit 2 | | | Unit 3 | | | Unit n (501) | | |
|---|---|---|---|---|---|---|---|---|---|---|---|---|
| Configuration information | A11 | ⋯ | A1n | A21 | ⋯ | A2n | A31 | ⋯ | A3n | An1 | ⋯ | Ann |
| | ○ | | ○ | ○ | | ○ | ○ | | ○ | - | | - |
| Configuration information | B11 | ⋯ | B1n | B21 | ⋯ | B2n | B31 | ⋯ | B3n | Bn1 | ⋯ | Bnn |
| | ○ | | ○ | ○ | | ○ | ○ | | ○ | - | | - |
| Configuration information | C11 | ⋯ | C1n | C21 | ⋯ | C2n | C31 | ⋯ | C3n | Cn1 | ⋯ | Cnn |
| | ○ | | ○ | ○ | | ○ | ○ | | ○ | - | | - |
| Configuration information | D11 | ⋯ | D1n | D21 | ⋯ | D2n | D31 | ⋯ | D3n | Dn1 | ⋯ | Dnn |
| | ○ | | ○ | ○ | | ○ | ○ | | ○ | - | | - |
| ECC Group (No.) | ↑ (11) | | ↑ (1n) | ↑ (21) | | ↑ (2n) | ↑ (31) | | ↑ (3n) | | | |

| System | Status | LED type | | LED lighting |
|---|---|---|---|---|
| | | Red LED | Green LED | |
| Normal system | HDD unloaded, power off | Off | Off | Off |
| | HDD effective, no I/O | Off | On | Green on |
| | HDD effective, I/O received | Off | Flickering | Green flickering |
| Anomaly system | Blocked, spare HDD load standby | On | Off | Red on |
| | Data erased HDD load standby / Data erase complete | On | On | Orange on |
| | During correction copy | Off | Flickering | Green flickering |
| | During data erase | Flickering | Flickering | Orange flickering |

Fig.10 B

| HDD/slot | Configuration information | Status | SAS Address | Present signal | Load confirmation |
|---|---|---|---|---|---|
| A1 | Yes | Blocked | Add1 | NULL | NULL |
| An | Yes | Normal | Add2 | NULL | NULL |
| B1 | Yes | Normal | Add3 | NULL | NULL |
| Bn | Yes | No HDD | NULL | NULL | NULL |

| HDD/slot | Configuration information | Status | SAS Address | Present signal | Load confirmation |
|---|---|---|---|---|---|
| A1 | Yes | Blocked | Add1 | 1 | NULL |
| An | Yes | Normal | Add2 | 1 | NULL |
| B1 | Yes | Normal | Add3 | 1 | NULL |
| Bn | Yes | No HDD | NULL | 0 | NULL |
| n1 | No | HDD loaded | NULL | 1 | NULL |
| n2 | No | No HDD | NULL | 0 | NULL |

| HDD_I/F controller number | HDD slot number | | | | | | | |
|---|---|---|---|---|---|---|---|---|
| | A1 | ... | An | B1 | ... | Bn | n1 | n2 |
| 11 | 1 | ... | 1 | — | ... | — | — | — |
| 12 | 1 | ... | 1 | — | ... | — | — | — |
| 21 | — | ... | — | 1 | ... | 0 | — | — |
| 22 | — | ... | — | 1 | ... | 0 | — | — |
| n1 | — | ... | — | — | ... | — | 1 | 0 |
| n2 | — | ... | — | — | ... | — | 1 | 0 |

| HDD/slot | Configuration information | Status | SAS Address | Present signal | Load confirmation |
|---|---|---|---|---|---|
| A1 | Yes | Blocked | Add1 | 1 | AddX (X being an arbitrary number other than 1) |
| An | Yes | Normal | Add2 | 1 | |
| B1 | Yes | Normal | Add3 | 1 | |
| Bn | Yes | No HDD | NULL | 0 | |
| n1 | No | HDD loaded | Add4 | 1 | |
| n2 | No | No HDD | NULL | 0 | Add1 |

Fig.11C

| HDD/slot | Configuration information | Status | SAS Address | Present signal | Load confirmation |
|---|---|---|---|---|---|
| A1 | Yes | Correction copy | Add5 | 1 | AddX (X being an arbitrary number other than 1) |
| An | Yes | Normal | Add2 | 1 | |
| B1 | Yes | Normal | Add3 | 1 | |
| Bn | Yes | No HDD | NULL | 0 | |
| n1 | No | HDD loaded | Add4 | 1 | |
| n2 | No | Data erase | Add1 | 1 | Add1 |

Fig.12B

| HDD/slot | Configuration information | Status | SAS Address | Present signal | Load confirmation |
|---|---|---|---|---|---|
| A1/A1→A1+/A1 | No | Data erase | Add1 | 1 | NULL |
| An | Yes | Normal | Add2 | 1 | NULL |
| B1 | Yes | Normal | Add3 | 1 | NULL |
| Bn | Yes | No HDD | NULL | 0 | NULL |
| n1/ n1→A1/n1 | Yes | Correction copy | Add4 | 1 | NULL |
| n2 | No | No HDD | NULL | 0 | NULL |
| n3 | No | HDD loaded | Add8 | 1 | NULL |
| nn | No | HDD loaded | Add9 | 1 | NULL |

Fig.13B

| HDD/slot | Configuration information | Status | SAS Address | Present signal | Load confirmation |
|---|---|---|---|---|---|
| A1 | Yes | Blocked | Add1 | 1 | NULL |
| An | Yes | Normal | Add2 | 1 | NULL |
| B1 | Yes | Normal | Add3 | 1 | NULL |
| Bn | Yes | No HDD | NULL | 0 | NULL |
| f1 | Yes | HDD loaded | Add10 | 1 | NULL |
| fn | Yes | No HDD | NULL | 0 | NULL |
| n1 | No | HDD loaded | NULL | 1 | NULL |
| n2 | No | No HDD | NULL | 0 | NULL |
| n3 | No | HDD loaded | Add8 | 1 | NULL |
| nn | No | HDD loaded | Add9 | 1 | NULL |

STORAGE DEVICE REPLACEMENT METHOD, AND STORAGE SUB-SYSTEM ADOPTING STORAGE DEVICE REPLACEMENT METHOD

TECHNICAL FIELD

The present invention relates to a storage device replacement method, and a storage sub-system adopting the storage device replacement method.

BACKGROUND ART

Recently, along with the explosive increase of the amount of information and data handled by companies and governments, the capacity of data to be processed and stored in large-scale computers such as host computers or in storage sub-systems coupled to servers and host computers have increased rapidly. Especially, unlike servers and other information processing systems, storage sub-systems are specialized in storing data, utilizing a large number of hard disks as data memory media having large capacity and high reliability, and are managed and operated via a RAID (Redundancy Array of Inexpensive Disks) configuration.

The prices of storage sub-systems are being reduced recently, along with which the hard disk drives (hereinafter abbreviated as HDD) used in storage sub-systems conventionally adopting fiber channel (hereinafter abbreviated as FC) type devices, which are expensive and have extremely high reliability, are now adopting inexpensive SAS (Serial Attached SCSI) type devices, and are further adopting SATA (Serial AT Attachment) type devices which are even more inexpensive than SAS.

Moreover, the capacity of the HDD is increasing significantly due to the recent advancement in the art of high density recording. Therefore, the risk of increase of the frequency of occurrence of unrecoverable errors and recoverable errors caused by physical defects such as scratches formed on the media being the recording section of the HDD (due to defects during manufacture or scratches formed by head contact) or read failure caused by insufficient recording is anticipated, and in the worst case, the HDD may fail and must be replaced.

Patent literature 1 teaches an example of a replacement method for replacing such failure HDD. According to the disclosure, the storage sub-system monitors a failure that may occur in one data disk out of a plurality of data disks constituting one or more RAID groups. If the occurrence of failure of a data disk is detected, other data disks belonging to the same RAID group the data disk in which failure has occurred is used to perform correction copy to an arbitrary spare disk. Thereafter, when the data disk in which failure has occurred is replaced with a new data disk for replacement, the disk array system changes the management information so that the spare disk is managed as data disk and the data disk is managed as spare disk.

CITATION LIST

Patent Literature

PTL 1: Japanese Patent Application Laid-Open Publication No. 2007-87039(U.S. Pat. No. 7,502,955)

SUMMARY OF INVENTION

Technical Problem

From the viewpoint of information security, rules are often established to forbid the HDD being the failure storage device in the storage sub-system from being taken out of the storage facility when replacing the HDD unless the data within the failure HDD is completely erased. Thus, a situation occurs in which the HDD being the failure storage device cannot be taken out of the facility.

Therefore, the present invention aims at solving these problems by providing a storage device replacement method capable of realizing replacement of storage devices such as HDDs in a short time, and a storage sub-system adopting such storage device replacement method.

Solution to Problem

In order to solve the above-mentioned problems, the present invention provides a storage sub-system comprising a storage device unit having a plurality of storage devices for storing data from the host computer, and a management unit for managing the storage device unit, wherein the management unit specifies a first slot of a storage device in which failure has occurred, specifies a second slot that differs from the specified first slot, and performs a data recovery processing and a data erase processing of the storage device in which failure has occurred using the first slot and the second slot. Further, the second slot is a slot determined by the management unit by sending a load information request to the storage device, acquiring a storage device load information, comparing the storage device load information with a configuration information managed in the storage sub-system, and extracting a slot in unused status from all slots of the storage sub-system.

According to the present storage sub-system, the management unit removes the storage device in which failure has occurred loaded in the first slot and loads the same to the second slot, loads a storage device to the first slot in vacant status, executes the data recovery processing to the storage device loaded to the first slot, and executes the data erase processing to the storage device in which failure has occurred loaded to the second slot. Furthermore, the management unit executes the data erase processing to the storage device in which failure has occurred loaded to the first slot, and executes the data recovery processing to the storage device either already loaded to the second slot or being loaded thereto.

According further to the present storage sub-system, the management unit notifies to a management terminal coupled to the storage sub-system one of the following information; a blockage information of the storage device in which the failure has occurred, the second slot information, a storage device load information to the second slot, a data erase complete, data recovery processing complete, and storage device removal complete information from the first slot or the second slot, and a storage device load complete information to the first slot or the second slot. Furthermore, the management unit sends a warning to the management terminal when the loading of the storage device to the first slot or the second slot is not completed within a predetermined time.

Advantageous Effects of Invention

According to the present invention, the data of the HDD in which failure has occurred can be erased without fail, and the risk of information leaking from the HDD being taken out of the storage facility can be reduced.

BRIEF DESCRIPTION OF DRAWINGS

FIG. 3B is a RAID group management table.

FIG. 7B is an HDD slot status—LED lighting table illustrating the correspondence between the HDD slot status and the LED lighting status.

FIG. 10B is an HDD configuration information management table for managing the HDD configuration information prior to acquiring the load information.

FIG. 10C is a view showing the status of the HDD configuration information management table after acquiring the load information.

FIG. 10D is a Present signal table of the HDD_I/F controller.

FIG. 11B is a view showing the status of the HDD configuration information management table prior to loading the failure HDD and the spare HDD.

FIG. 11C is a view showing the status of the HDD configuration information management table after loading the failure HDD and the spare HDD.

FIG. 12B is a view illustrating the status of the HDD configuration information management table when the HDD outside the configuration is used as the spare HDD.

FIG. 13B is a view showing the state of the HDD configuration information management table after adding an HDD.

DESCRIPTION OF EMBODIMENTS

Figure 1:
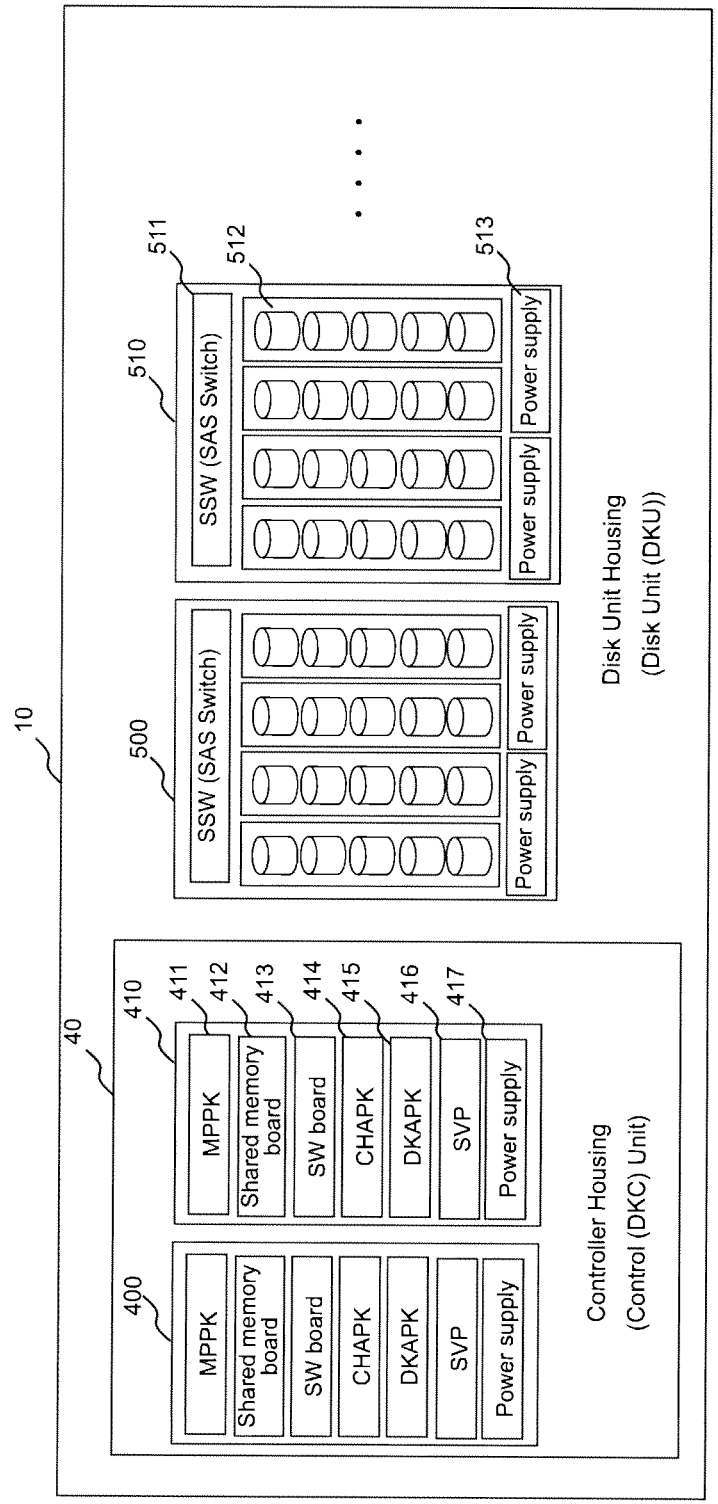
FIG. 1 illustrates an internal configuration of a storage sub-system.

Now, the preferred embodiments of the present invention will be described with reference to the drawings. In the description, various information are described using expressions such as a "management table", but the various information can be expressed by data structures other than tables. Further, the "management table" can also be referred to as "management information" to show that the information does not depend on the data structure.

The processes are sometimes described using the term "program" as the subject. The program is executed by a processor such as a MP (Micro Processor) or a CPU (Central Processing Unit) for performing determined processes. A controller can also be the subject of the processes since the processes are performed using an appropriate storage resource (such as a memory) and a communication interface device (such as a communication port). The controller can also use dedicated hardware in addition to the CPU. The computer program can be installed to each computer from a program source. The program source can be provided via a program distribution server or a storage media, for example.

Each element such as the HDD and the controller unit can be identified via numbers, but other types of identification information such as names can be used as long as they are identifiable information. The equivalent elements are provided with the same reference numbers in the drawings and the description of the present invention, but the present invention is not restricted to the present embodiments, and other modified examples that correspond to the present invention are included in the technical range of the present invention. The number of each component can be one or more than one unless defined otherwise.

In the following description, the storage sub-system is an HDD, but the present invention is not restricted to HDDs, and the invention can be applied to other storage sub-systems composed for example of flash memories or other nonvolatile semiconductor devices or re-writable storage sub-systems such as optical disk media.

<Storage Sub-system Configuration>

Figure 2:
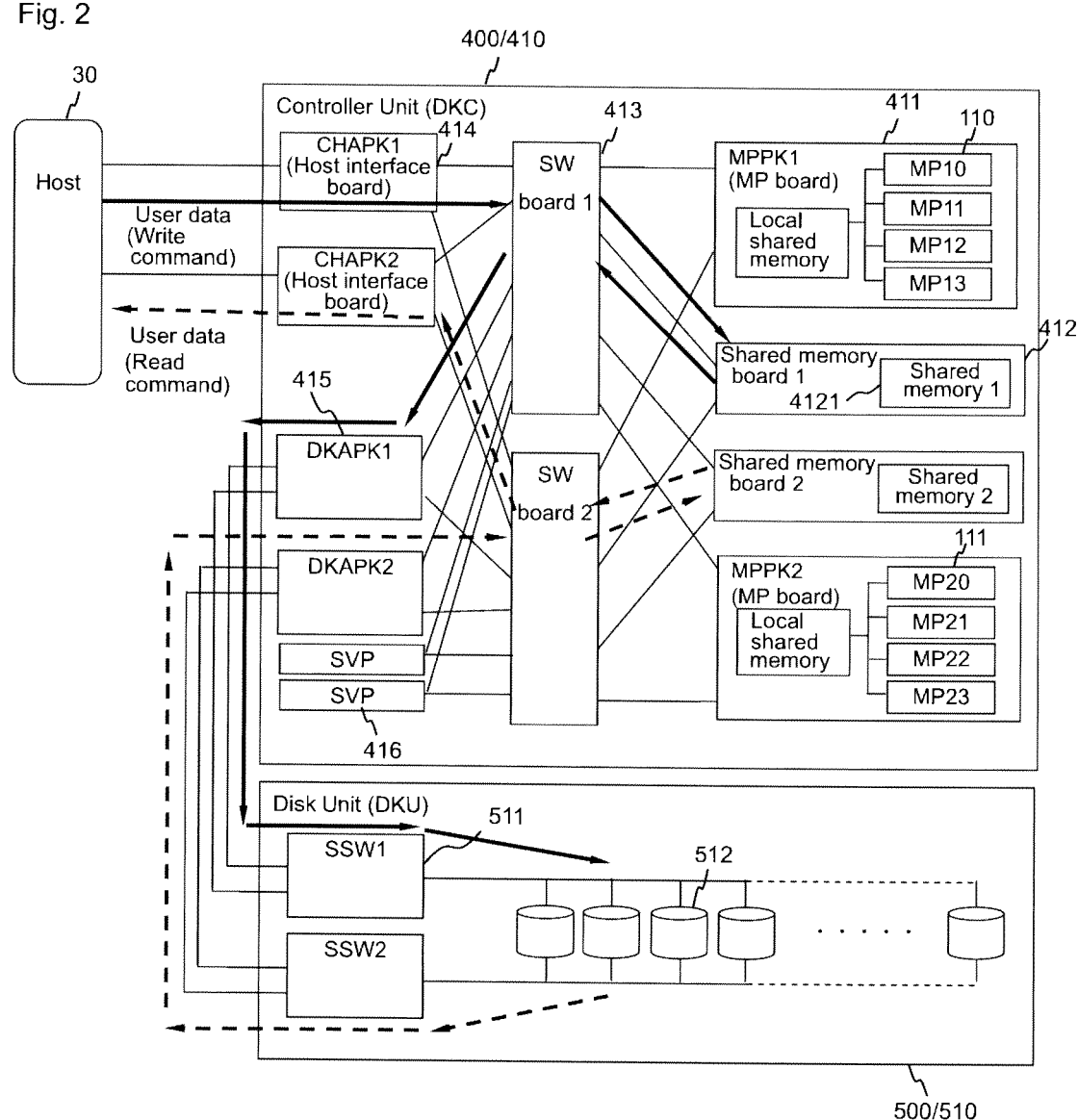
FIG. 2 is a block diagram illustrating an interior of the storage sub-system.

FIG. 1 is a view illustrating an internal configuration of a storage sub-system. FIG. 2 is a block diagram of the interior of the storage sub-system. First, the internal configuration of the storage sub-system 10 will be described with reference to FIGS. 1 and 2. The storage sub-system 10 is mainly composed of a controller housing composed of controller units 400 and 410 and a disk unit housing composed of disk unit sections 500 and 510. Further, the controller housing adopts a cluster configuration 40 (duplicated configuration using controller unit 400 and controller unit 410).

Further, the controller unit 400 is composed of one or more MPPKs (Micro Processor Packages) 411, a shared memory board 412 mounting a shared memory shared by various processors and controller LSIs (Large Scale Integrated) for retaining and referring to data, a switching board (hereinafter referred to as SW board) 413 coupling various processors and controller LSIs via a high-speed internal bus, one or more CHAPKs (Channel Adapter Packages) 414 for coupling with a host 30 via a network, one or more DKAPKs (Disk Adapter Packages) 415 for coupling with the disk unit section 500 and 510, an SVP (Service Processor) 416 which is a management terminal for monitoring the status of the storage sub-system 10 and performing maintenance and management thereof, and a power supply unit 417. The controller unit 410 is formed in a similar manner.

The host 30 refers to a work station, a server, a mainframe and the like, and the host 30 is coupled to the storage sub-system 10 via a LAN (Local Area Network), a SAN (Storage Area Network) and the like. A SAN refers to a network dedicated to a storage system for coupling the host 30 and the storage sub-system 10.

The CHAPK 414 includes a CHA_I/F (Channel Adapter Interface) controller, wherein the CHAPK is coupled to the host 30 via the CHA_I/F controller and through the LAN, SAN or the like, so as to send to and receive from the host 30 a read/write command, data and the like.

The MPPK 411 is a board mounting a plurality of MP (Micro Processors) 110/111, and is associated with the processing of control commands and transferring of data. The drawing illustrates an example in which four MPs are loaded on a single MPPK. Further, for enhanced access performance, each MP is equipped with a local shared memory 4111 for accessing the control information, management information and data at high speed.

The shared memory 4121 is mounted on a shared memory board 412, which is used to temporarily store data sent from the host 30 or to share information among MPs 110. The SW board 413 is coupled for example to the MPPK 411, the shared memory board 412, the CHAPK 414, the DKAPK 415, the SVP 416 and the like to execute switching of control commands and data transfer.

The DKAPK 415 has a function to transfer user data and control commands to the disk unit section 500/510, and includes a DKA_I/F controller (not shown) for realizing the same. The SVP 416 is a management terminal for managing the configuration information or the operation status of the storage sub-system 10 and monitoring the failure status. When failure occurs, the SVP 416 sends a failure information to a maintenance center using a dedicated line, for example.

The power supply unit 417 is composed of an AC/DC converter for converting a single phase/three-phase 100V/200V AC voltage supplied from the exterior to a predetermined DC voltage, a DC/DC converter for converting the above-mentioned converted DC voltage into various DC voltages such as 3 V (volt) voltage/5 V voltage/12 V voltage for supplying the same to various devices used in the storage sub-system, and a chargeable battery for supplying power to the device when external power supply is shutoff.

FIG. 2 illustrates an example in which various types of boards are loaded two at a time, but according to the system configuration of the storage sub-system, it is possible to couple three or more of each type of boards. Further, a maximum of eight disk units can be coupled continuously, and a maximum of 128 HDDs can be loaded on one disk unit. That is, an enormous number of HDDs as much as 1024 (128 HDD per unit by eight units) can be loaded in the whole storage sub-system 10 as storage devices. Typical types of HDD include SAS (Serial Attached SCSI) type HDD, SATA (Serial AT Attachment) type HDD, and SSD (Solid State Drive) composed of flash memories and the like which are nonvolatile semiconductor memories. One or more RAID groups can be composed of a plurality of storage devices.

Further, it is desirable to have the logical positions which are the management positions of the HDD constituting the RAID group correspond to the physical positions in which the actual HDD are inserted. Since a maximum of 1024 HDDs are loaded in the storage sub-system 10, if the physical position of the HDD differs from and is distant from the logical position in which the HDD is managed in the MP, the workability and the maintenance ability are deteriorated. Thus, the logical position of the HDD is made to correspond to the physical position thereof so that the physical position (slot position) can be confirmed easily in the SVP 416 during maintenance so as to facilitate maintenance.

The disk units 500/510 each comprise a SSW (SAS Switch) 511 which is an OF controller board for coupling with redundant controller units 400/410, a power supply unit 513 and a plurality of HDDS 512. A plurality of boards or a plurality of HDDs can be coupled according to the system configuration. The SSW 511 has a function to receive data from the controller units 400/410 and store the same in a storage sub-system, and a function to receive and process control commands.

<Basic Operation of IO Access>

Next, the operation performed when an IO access request is received from the host will be described with reference to FIG. 2. As an actual access example, a write request from the host 30 to the storage sub-system 10 will be described. The CHAPK 1 receives a write command and a write data (hereinafter referred to as data) from the host 30 with respect to a certain LDEV (Logical Device). An LDEV refers to a logical device, and the access to user data is managed via LDEV units.

The CHAPK 1 having received the request writes a write command and data via the SW board 1 into the shared memory 1 on the shared memory board 1. At the time point when the data is stored in the shared memory 1, a write complete report is sent to the host 30. Next, the MP (such as MP 10) loaded on the MPPK 1 detects the write command and data written to the shared memory 1 and transfers the same via the SW board 1 and the DKAPK 1 to the disk unit section 500. Thereafter, the SSW 1 of the disk unit section 500 to which the write request has been transferred writes the data into the HDD 512. The above describes the operation of the processing of the write request from the host 30 to the storage sub-system 10, and the flow of data and command of the write request is shown by the solid line arrow.

The shared memory stores control programs, commands, data and various management information. Examples of the control programs include a command control program for interpreting the command from the host 30 and executing the processing stated in the command, a configuration control command for setting the configuration of the storage sub-system 10 and executing processes such as update, and an I/O program for controlling the access to the storage device.

A typical example of the management information is a MP-LDEV mapping table. The MP-LDEV mapping table is for determining which MP is in charge of executing a certain processing out of the multiple MPs capable of accessing a certain LDEV. In other words, the MP refers to the MP-LDEV mapping table in the shared memory via polling, and when it determines that a command regarding the LDEV has been written and the MP itself has the ownership (right to execute processing with priority than the other MPs) of the LDEV, the MP executes the command processing.

In contrast to the write request, if the storage sub-system 10 receives a read request from the host 30, the CHAPK 2 searches the shared memory 2 on the shared memory board 2, wherein if the target data exists, the data is transferred to the host 30, and if not, the read command is written into the shared memory 2. Thereafter, the MP (such as the MP 20) performs polling of the shared memory 2, and determines whether the read command is a read command that must be performed by itself. If the read request must be performed by itself, the MP transfers the read request to the SSW 2 so as to read the data stored in the disk unit section.

The SSW 2 having received the transferred read request reads the given data from the HDD 512 and transfers the same to the DKAPK 2. The MP 20 writes the data having been transferred to the DKAPK 2 into the shared memory 2. Thereafter, the CHAPK 2 transfers the data written in the shared memory 2 to the host 30. The above describes the operation for processing a data read request from the host 30 to the storage sub-system 10, and the flow of data from the HDD 512 to the host 30 in the read request is shown by the dotted-line arrow.

Figure 3A:
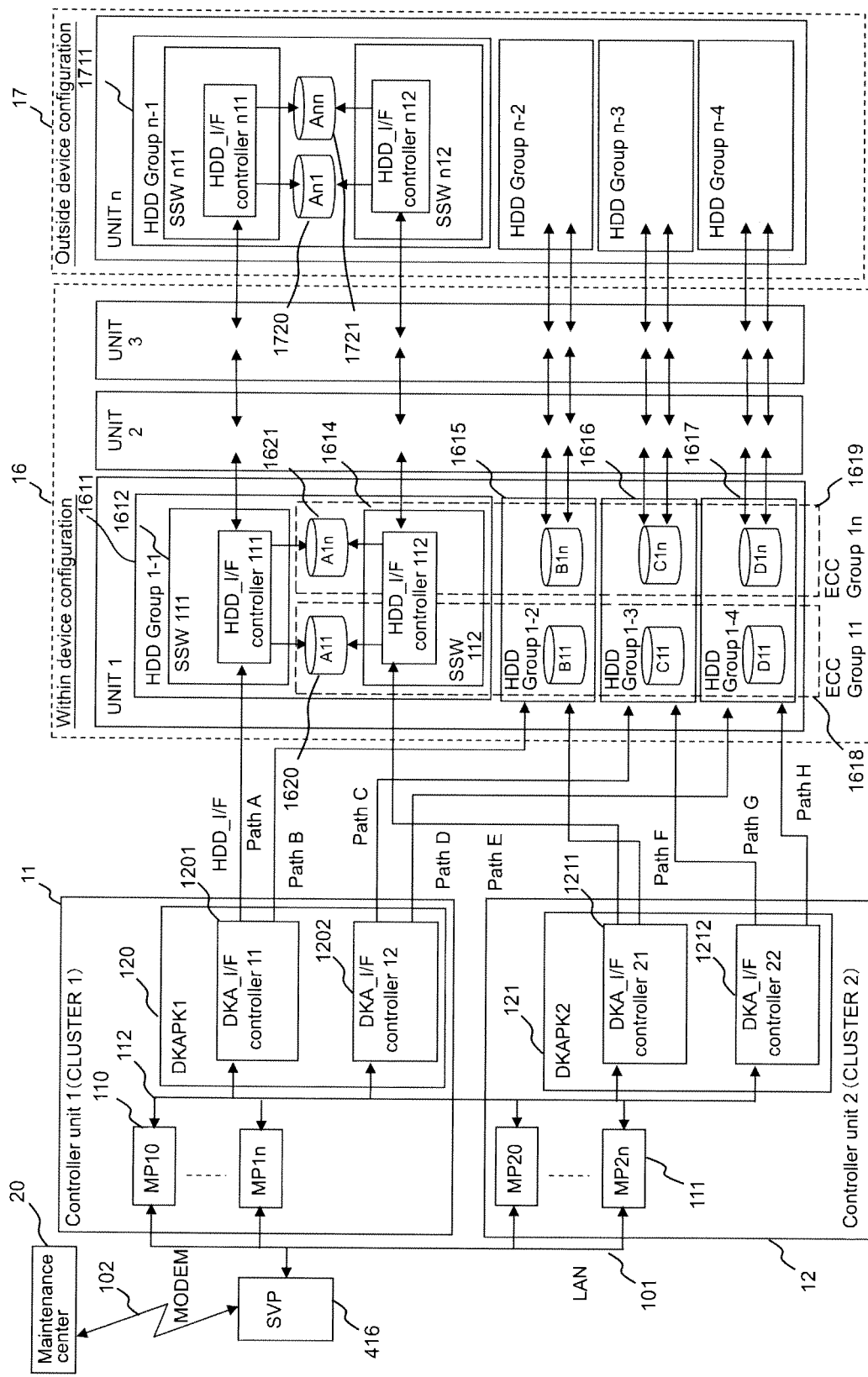
FIG. 3A is a block diagram illustrating a relationship between an HDD group and a RAID group of the storage sub-system.

FIG. 3A is a block diagram showing the relationship between the HDD group and the RAID group of the storage sub-system. FIG. 3B is a RAID group management table. The relationship between the HDD group and the RAID group of the storage sub-system will be described with reference to FIGS. 3A and 3B. First, the internal configuration of the storage sub-system will be described in further detail.

The storage sub-system 10 has a plurality of SVPs 416, which are coupled to the respective MPs 110/111 via a LAN 101. Further, the SVP 416 is coupled via a modem 102 to a maintenance center 20, and the operation status of the storage sub-system 10 or whether failure has occurred or not are notified via the SVP 416 to the maintenance center 20.

By having the plurality of MPs (MP 10-MP 2n) in the controller unit 1 11 (CLUSTER 1) and the controller unit 2 12 (CLUSTER 2) coupled via a DKA_I/F controller within the DKAPK to an HDD_I/F controller, the respective MPs can access storage devices such as HDD_A11, A12, . . . An1, Ann, Dnn and so on. The DKA_I/F controller is also called a SAS expander, which is a controller capable of coupling a greater number of SAS devices than the standard.

Actually, the controller unit 1 11 (CLUSTER 1) and the controller unit 2 12 (CLUSTER 2) forming a redundant structure via a cluster configuration are each equipped with a similarly redundant DKAPK1 120 composed of a DKA_I/F controller 11 1201 and DKA_I/F controller 12 1202 and a DKAPK2 121 composed of a DKA_I/F controller 21 1211 and DKA_I/F controller 22 1212.

Each DKA_I/F controller is equipped with two paths (HDD_I/F lines) coupled to HDD_I/F controllers in the disk unit section. For example, the DKA_I/F controller 11 1201 has Path_A and Path_B. Path_A is coupled to a HDD_I/F controller 111 of a SSW 111 1612 within HDD group 1-1 of unit 1 within the device configuration 16. Similarly, Path_B is coupled to an HDD_I/F controller (not shown) within HDD group 1-2.

An HDD or an HDD slot within the device configuration (hereinafter referred to as within configuration) refers to an HDD or an HDD slot registered in advance in a local shared memory or the like within the MPPK and managed by the MP as a range used for storing data or the like during startup of the device out of all the HDDs and HDD slots disposed in the storage sub-system. By setting the HDD or the HDD slot to be within the configuration, the storage sub-system can start management of the respective HDDs and the respective HDDs can be used. The RAID group is also composed of HDDs within the configuration. As for a Discover command described later, the capacity of processing and management information via the MP can be reduced by storing only the result of response from the HDD within the configuration during processing of normal operation such as HDD addition processing shown in FIG. 13A, excluding the present HDD replacement processing. On the other hand, an area outside the device configuration (hereinafter referred to as outside the configuration) refers to the HDD or the HDD slot not set as within the configuration or the HDD or the HDD slot that is not yet loaded. The HDD outside the configuration is not managed to be used by the MP, so that data is not written into the HDD via write processing or data is not read therefrom via read processing from the host.

Further, in the controller unit 2 12, the DKA_I/F controller 21 1211 includes a Path_E and a Path_F. The Path_E is coupled to an HDD_I/F controller 112 of SSW 112 1614 within HDD group 1-1 of unit 1 within configuration 16, and similarly, Path_F is coupled to an HDD_I/F controller (not shown) within HDD group 1-2.

Furthermore, HDD_A1 1620 and HDD_A1n 1613 are coupled to both the afore-mentioned HDD_I/F controller 111 and HDD_I/F controller 112 constituting a redundant structure, so that access is enabled even if failure occurs to one of the HDD_I/F controllers. The HDDs having numbers B11, B1n, C11, C1n, D11 and D1n are formed similarly. Even further, unit 2 and unit 3 within the configuration 16 and unit n outside the configuration 17 are also coupled redundantly with the controller unit via HDD_I/F lines (two-way arrows in the drawing).

Further, the RAID group called ECC (Error Correcting Code) group is composed of a plurality of HDDs. For example, ECC group 11 1618 constitutes a RAID5 (3D (data disks)+1P (parity disk)) configuration composed of HDD_A11 of HDD group 1-1, HDD_B11 of HDD group 1-2, HDD_C11 of HDD group 1-3, and HDD_D11 of HDD group 1-4. The configuration example thereof can be three data disks composed of HDD_A11/B11/C11 and one parity disk composed of HDD_D11, using a total of four disks. These HDDs are disposed in adjacent slots to facilitate maintenance.

Similarly, the ECC group 1n 1619 is composed of HDD_A1n of HDD group 1-1, HDD_B1n of HDD group 1-2, HDD_C1n of HDD group 1-3, and HDD_D1n of HDD group 1-4. Unit 2 and unit 3 are composed in a similar manner. The correspondence between the RAID groups and HDDs is shown in RAID group management table of FIG. 3B.

In storage sub-system 10, as shown in FIG. 3B, HDD_A11 through HDD_D3n managed by respective configuration information 5011 of respective HDD groups of unit 1, unit 2 and unit 3 within the configuration constitutes and manages a RAID group every 3n from the ECC group 11 managed via the management information 5012 of the ECC group. In other words, storage sub-system 10 manages HDD_Axy to HDD_Dxy as a single ECC group xy (x: 1-3, y: 1-n).

Further, from HDD_An1 to HDD_Dn1 of unit n disposed outside the configuration does not constitute an ECC group since the HDDs are either unused by the storage sub-system 10 or the devices are in a non-loaded state. Therefore, the HDDs disposed outside the configuration are managed as a state not constituting a RAID group as shown in FIG. 3B. Further, FIG. 3B shows an example in which the whole of unit n is arranged to be outside the configuration, but the present invention is not restricted to such example, and each HDD unit alone can be set to be outside the configuration or within the configuration.

<Storage Device Replacement Method>
<Replacement Method 1: Data Erase and Correction Copy>

Figure 4:
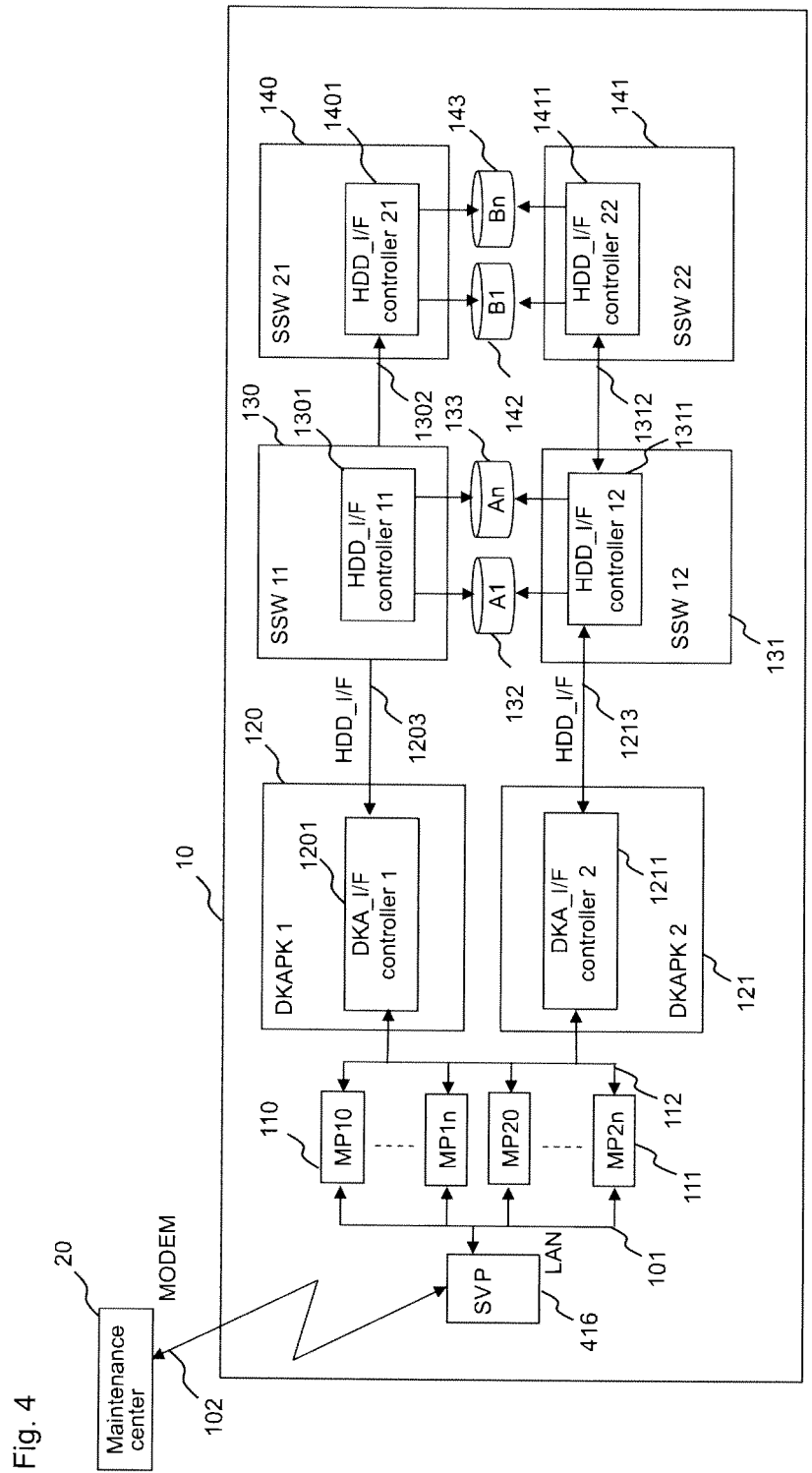
FIG. 4 is a hardware block diagram for executing data erase of failure HDD and replacement processing of spare HDD.
Figure 5:
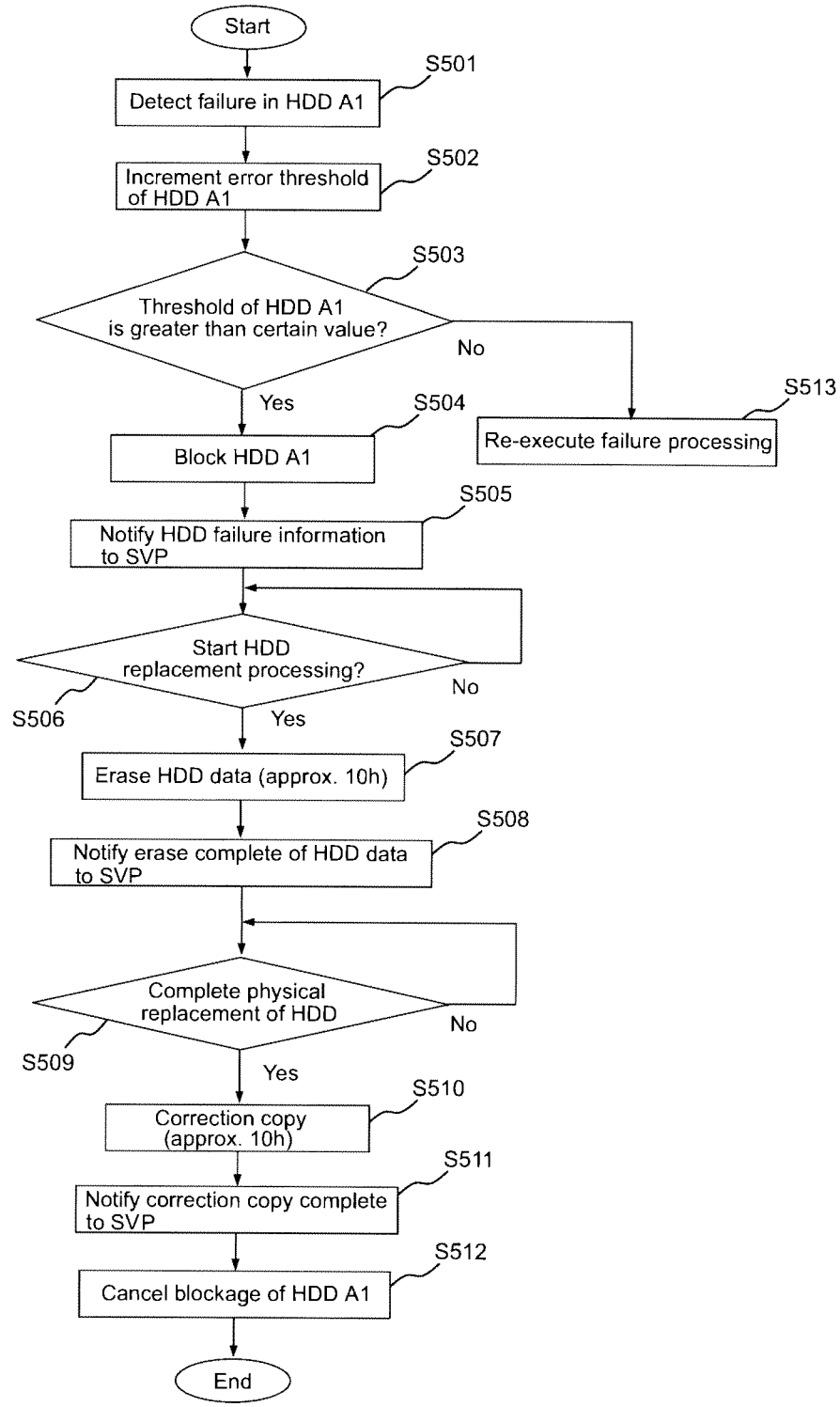
FIG. 5 is a flowchart illustrating data erase of the failure HDD and replacement processing of the spare HDD.

FIG. 4 is a hardware block diagram for executing data erase of the failure HDD and replacement processing of a spare HDD. FIG. 5 is a flowchart illustrating the erasing of data of the failure HDD and the replacement processing of the spare HDD. Next, the HDD replacement method for bringing the failure HDD from inside the user facility where the storage sub-system 10 is installed to the exterior of the facility such as a maintenance center of a maintenance company will be described with reference to FIGS. 4 and 5. In order to simplify the explanation, the plurality of MPs are simply referred to as MP and no identification numbers or reference numbers will be provided.

The present embodiment illustrates an example in which a fatal error occurs to the HDD_A1 132 loaded in slot A1 and replacement of the device becomes necessary, wherein an HDD replacement method is performed by executing erasing of data and correction copy using an MP (any one of the MPs from MP 10 to MP 1n). At first, when the MP detects failure via access to the HDD_A1 132 (S501 of FIG. 5), the MP increments an error threshold of HDD_A1 132 (S502). Next, the MP determines whether the error threshold in HDD_A1 132 is greater than a certain value or not (S503). If the error threshold of HDD_A1 132 is not greater than a certain value (NO in S503), the MP re-executes the processing in which failure has occurred (S513).

When the error threshold in HDD_A1 132 has become greater than a certain value (Yes in S503), the MP blocks HDD_A1 132 (S504). At that time, the MP notifies the failure information (such as the slot number, the number of occurrence of failure, the HDD type and capacity) of the blocked HDD_A1 132 to the SVP 416 (S505). Thereafter, until the MP detects starting of the HDD replacement processing by the maintenance center, the MP executes the loop of step S506 and enters a standby status.

The SVP 416 having received the failure information transfers the notified failure information via the modem 102 to the maintenance center 20. The maintenance center 20 having received the failure information can comprehend what type of failure has occurred in the storage sub-system 10 based on the failure information and can plan measures to cope with the failure. In the present case, the method is to perform a replacement operation of the HDD_A1 132, and the operation can be started.

When the HDD replacement operation is started (Yes in S506), a command to erase data is issued from the MP to the HDD_A1 132. The HDD_A1 132 having received the command erases the original data by writing in arbitrary data to the whole area of the storage media (S507). One example of the method for erasing data is a method based on DoD 5220.22-M standard set by the United States Department of Defense. Based on this method, memory data is erased by writing all "0" data to the whole area of the memory media in the storage device in the first step, writing all "F" data in the second step, and writing all "0" data again in the third step. The data erase time is proportional to the HDD capacity, and in a standard SATA HDD having a capacity of 2 TB (Tera Bytes), the erase time is approximately 10 hours.

When the erasing of data is completed, the HDD_A1 sends a data erase complete notice to the MP. The MP having received the data erase complete notice transfers the erase complete notice to the SVP 416 and notifies that the HDD is in a replaceable state (S508). The SVP 416 transmits the received erase complete notice to the maintenance center 20 and monitors completion of physical replacement of the HDD (S509).

Next, the maintenance center 20 having received the erase complete notice executes the HDD replacement operation (operation to replace the failure HDD_A1 with a spare HDD). When completion of the HDD replacement operation is detected (Yes in S509), the MP compares the unique information such as the SAS address (all SAS devices have an automatically allocated information that is unique throughout the world for easily identifying the initiator device, the target device and the expander) or the serial number of the HDD prior to replacement and the HDD after replacement.

As a result of the comparison, it is confirmed that the HDD has been replaced correctly (that the SAS address differs), and thereafter, correction copy is performed using the other HDD_B1, HDD_C1 and HDD_D1 excluding the HDD_A1 constituting the ECC group 11 1618 to the HDD (new HDD_A1) loaded in slot A1 (S510). Correction copy requires three processes, which are a process of reading data (user data and parity data) from a normal HDD, a write data generation and computation processing based on the read data, and a writing process of the generated write data, which requires similar execution time as the time required to erase data in the HDD (approximately 10 hours).

When correction copy to HDD_A1 is completed, the MP sends an HDD correction copy complete notice to the SVP 416, and notifies completion of all HDD replacement operation (data erase, HDD replacement and correction copy) (S511). Lastly, the MP cancels the occlusion of the HDD_A1 and returns the storage sub-system 10 to a complete operation status. Further, the processes from S504 through S512 can be performed in the background while performing normal processes such as the processing of write requests or read requests from the host 30.

As described, the maintenance performance is enhanced since the erasing of data of the HDD, the HDD replacement operation and the correction copy after replacing the HDD when HDD failure occurs can be performed in the same HDD slot. However, the present method has a drawback in that the time required from the occurrence of failure to resolution of failure is as long as approximately 20 hours (10 hours to erase data and 10 hours to perform correction copy), and a maintenance crew must stand by near the storage sub-system in which failure has occurred during that time, so the solving of such drawback becomes necessary.

Further, along with the recent increase in capacity of the storage device, when three processes including the erasing of data within the storage device, the replacement of the device with a new storage device and the restoration of data are performed, even longer time is required from when failure occurs to the storage device to the completion of restoration of data, and since redundancy cannot be ensured for another failure that may occur during that time, the risk of data loss is increased.

Therefore, the present invention provides a storage device replacement method having a further improved maintenance performance and a storage sub-system using the same as described below.

<Replacement Method 2: Parallel Processing of Data Erase and Correction Copy>

Figure 6:
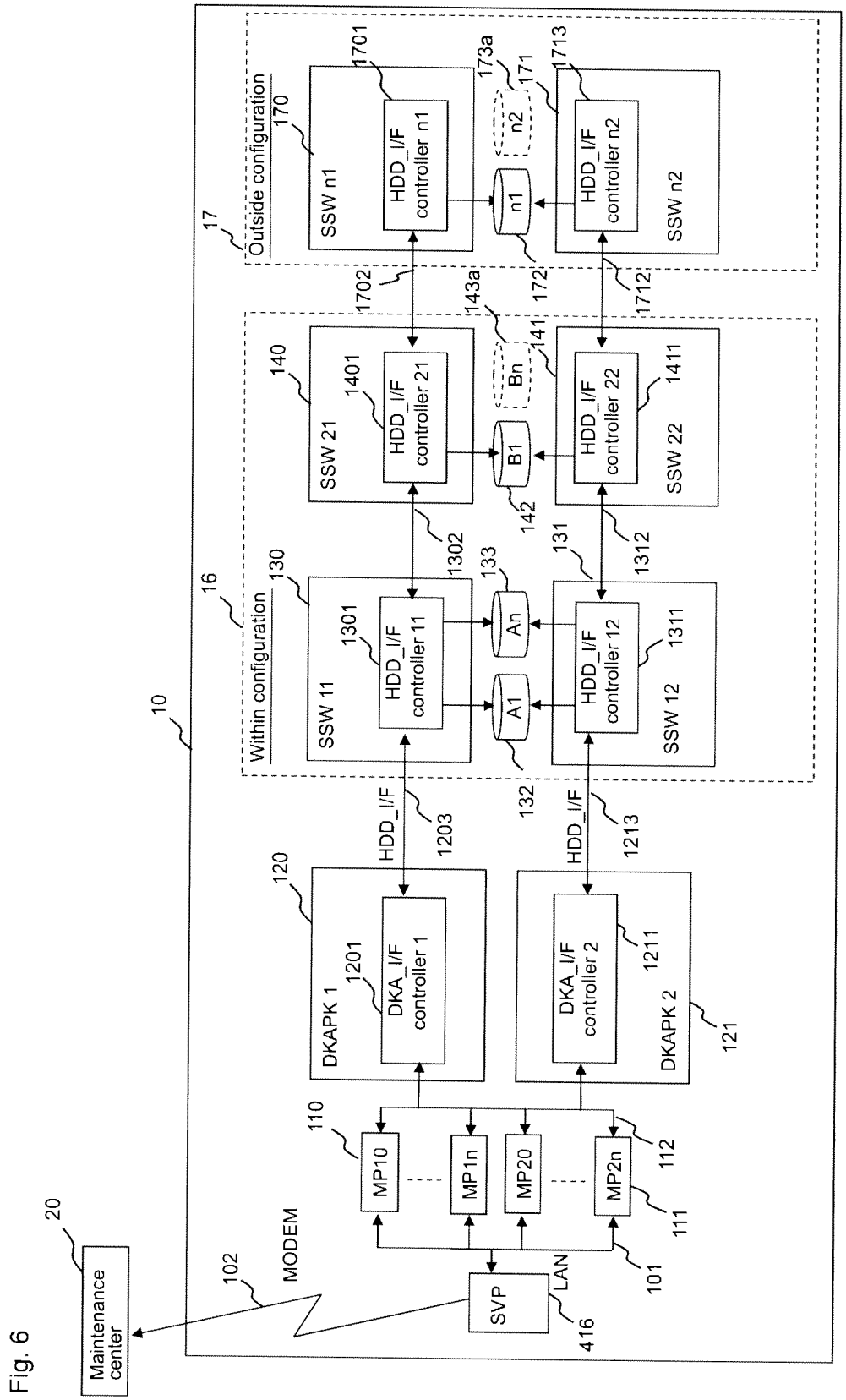
FIG. 6 is a hardware block diagram for executing data erase and correction copy processing.
Figure 7A:
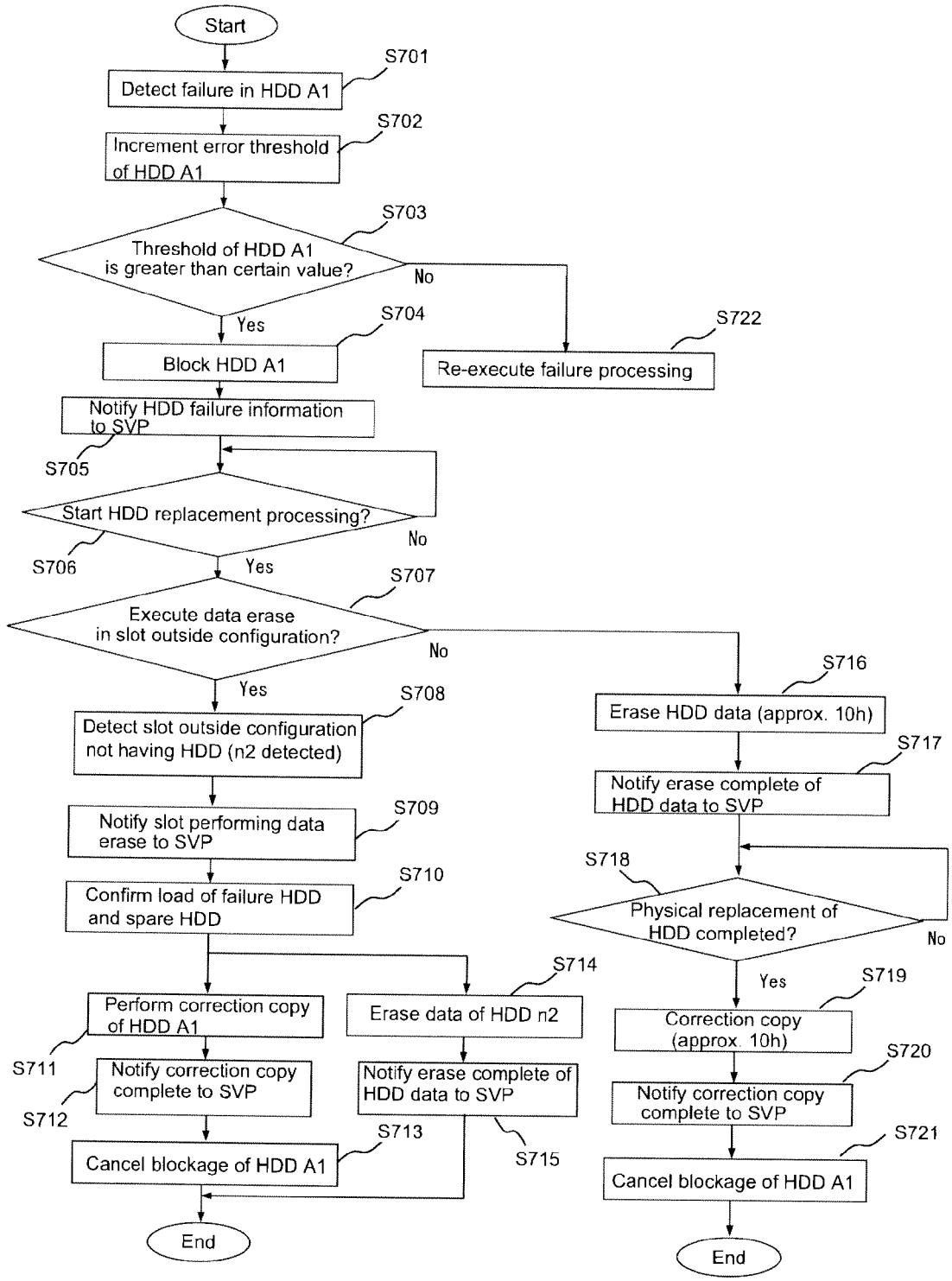
FIG. 7A is a flowchart illustrating data erase and correction copy processing.

FIG. 6 is a hardware block diagram executing data erase and correction copy. FIG. 7A is a flowchart illustrating the process of data erase and correction copy. FIG. 7B is an HDD slot status—LED lighting table showing the correspondence between the HDD slot status and the LED lighting status.

FIGS. 6, 7A and 7B illustrate a second storage device replacement method. In the present embodiment, as shown in FIG. 6, the HDD_UF controllers 11, 12, 21 and 22 and HDD_A1 through HDD_An and HDD_B1 through HDD_Bn (HDD_Bn is not yet loaded) are registered in the device configuration (within the configuration) under the control of the SSW. HDD_UF controllers n1 and n2 and HDD_n1 and HDD_n2 (HDD_n2 is not yet loaded) exist outside the configuration which are not registered in the device configuration. Such device configuration information is set up and registered in the SVP 416, and the registered device configuration information is stored and maintained in a shared memory 412 and the like.

It is assumed that failure has occurred in HDD_A1 132 in the device configuration described above, and the method for replacing the HDD (storage device) (execution of data erase and correction copy by MP (any one of MP 10 to MP 1n)) will be described.

At first, when the MP detects failure through access to HDD_A1 132 (S701 of FIG. 7), the MP increments the error threshold of HDD_A1 132 (S702). Next, the MP determines whether the error threshold of HDD_A1 132 is greater than a certain value or not (S703). If the error threshold of HDD_A1 132 is not greater than a certain value (No in S703), the MP re-executes the processing during which failure has occurred (S722).

If the error threshold of HDD_A1 132 has become greater than a certain value (Yes in S703), the MP blocks HDD_A1 132 (S704). At that time, the MP notifies the failure information of the blocked HDD_A1 132 (slot number and the like) to the SVP 416 (S705). Thereafter, until the start of the HDD replacement processing performed by the maintenance center, the MP executes the loop of step S706 and enters a standby state.

The SVP 416 having received the notice of failure information transfers the notified failure information via the modem 102 to the maintenance center 20. The maintenance center 20 having received the failure information can comprehend what type of failure has occurred in the storage sub-system 10 based on the failure information and can plan measures to cope with the failure. In the present case, the method is to perform a replacement operation of the HDD_A1 132, and the operation can be started.

When the HDD replacement operation is started (Yes in S706), the MP first determines whether to perform data erase of the failure HDD and the correction copy to the spare HDD (replacement HDD) using an HDD slot outside the configuration. If the processes are not performed in the HDD slot outside the configuration (No in S707), the MP executes the processes of steps S716 through S721. The processes of steps S716 through S721 are the same as the processes of steps S507 through S512 of FIG. 5, so detailed descriptions thereof are omitted.

If the processes are to be performed in the HDD slot outside the configuration (Yes in S707), the MP detects a slot outside the configuration of the device not having an HDD inserted thereto and can be used for erasing data from the HDD via the procedure described later (detection and management of HDD existing outside the configuration) (S708). At this time, if a slot (n2, for example) arranged outside the configuration that can be used for deleting data of the failure HDD is detected, the MP 10 notifies the SVP 416 that slot n2 can be used (S709).

Thereafter, MP confirms via the load confirmation processing of the failure HDD and the spare (replacement) HDD that the failure HDD_A1 is loaded in slot n2 and that the spare (replacement) HDD is loaded in slot A1 (S710).

During maintenance operation such as the present HDD replacement operation, the maintenance performance can be enhanced through use of a correspondence table 1100 of the HDD status and the LED lighting status shown in FIG. 7B. The HDD has a red LED and a green LED disposed in the interior thereof. Therefore, by combining the off/flickering/on of the red LED and the green LED, it becomes possible to express the flickering or lighting of various colors (red, green, orange (synthetic color of red and green)) that can be easily distinguished by the maintenance crew or user.

Therefore, it becomes possible to facilitate maintenance and improve maintenance performance by having the color statuses of the LED correspond to the HDD statuses, and enabling the lighting status of the LED to be confirmed from the exterior of the HDD or the slots by the maintenance crew or the user. For example, if a red LED 11004 is "off" and a green LED 11005 is also "off", the maintenance crew or the user can recognized that the LED window section of the slot (LED lighting 11006) is "off". According to the status of the HDD at this time, the system 11001 is "normal" and status 11002 is either "HDD unloaded" or "power off". In other words, slot Bn 143a or slot n2 173a in FIG. 6 in which the HDD is unloaded corresponds to this status.

In slot A1 after executing step S704 of FIG. 7A, the system 11001 is "anomaly system", the status 11002 is "blocked, spare HDD load standby", by which the red LED 11004 is "on" and the green LED 11005 is "off", so that the maintenance crew or the user can recognize that the LED window section of the slot (LED lighting 11006) is "red light on".

Similarly, the maintenance crew or the user can recognize that during correction copy (step S711 of FIG. 7A) the LED window section of the slot (LED lighting 11006) is in "green light flickering" state, and during data erase (step S714 of FIG. 7A) the slot is in "orange light flickering" state. Further, when data erase is complete (step S715 of FIG. 7A) the LED window section of the slot (LED lighting 11006) is in "orange light on" state, so completion of data erase can be confirmed by comparing the status display of the SVP 416.

Next, simultaneously as issuing a data erase command to the failure HDD_A1 (loaded in slot n2) to execute data erase (S714), the MP performs correction copy to the spare HDD (loaded in slot A1) (S711). Thereafter, when the respective processes are completed, the MP sends a correction copy complete notice (S712) and a data erase complete notice (S715) to the SVP 416. Lastly, the MP cancels blockage of the HDD_A1 (S713) and returns the storage sub-system 10 to a normal operation status. Further, the processes from S708 through S715 and the processes from S716 through S721 can be performed in the background while performing normal processes such as the processing of write requests or read requests from the host 30.

As described, by using an HDD non-loaded slot outside the configuration of the storage sub-system, it becomes possible to independently perform data erase of the failure HDD and correction copy to the spare HDD in a parallel manner. Therefore, the time required to return the storage sub-system 10 to a normal status can be shortened to be equal to the longer time of the execution time of correction copy or the data erase time of the failure HDD (which is as short as approximately half the time compared to the case of FIG. 5).

From the viewpoint of maintenance performance, it is not desirable that the spare HDD is loaded in a slot that differs from the original configuration information. Especially in storage sub-system 10 allowing a maximum of 1024 HDDs to be loaded thereto, it is necessary to have the physical position of the HDD correspond to the logical position thereof managed by the MP. If the physical position of the HDD corresponds to the logical position managed by the MP, it is possible to simultaneously confirm the logical position in the SVP 416 and the physical slot position, so the maintenance performance is enhanced. Further, by the HDD replacement method mentioned above, the spare HDD can be loaded in the slot A1 in which the failure HDD has been loaded previously, so that the physical position thereof will not be changed and the maintenance performance will not be deteriorated.

<Detection Processing of HDD Outside Device Configuration>

Figure 8:
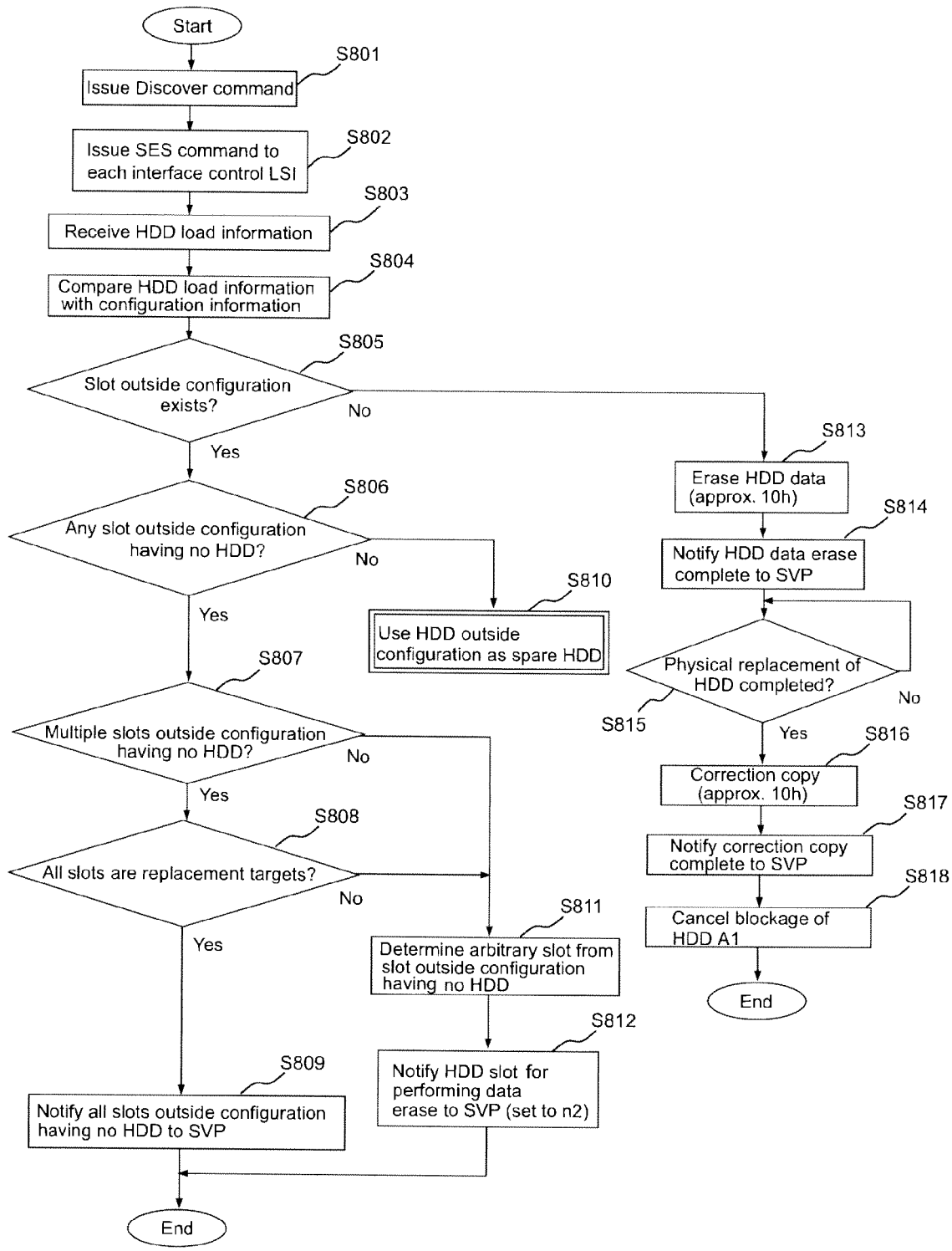
FIG. 8 is a flowchart illustrating a free slot detection processing outside the configuration using the Present signal.
Figure 9:
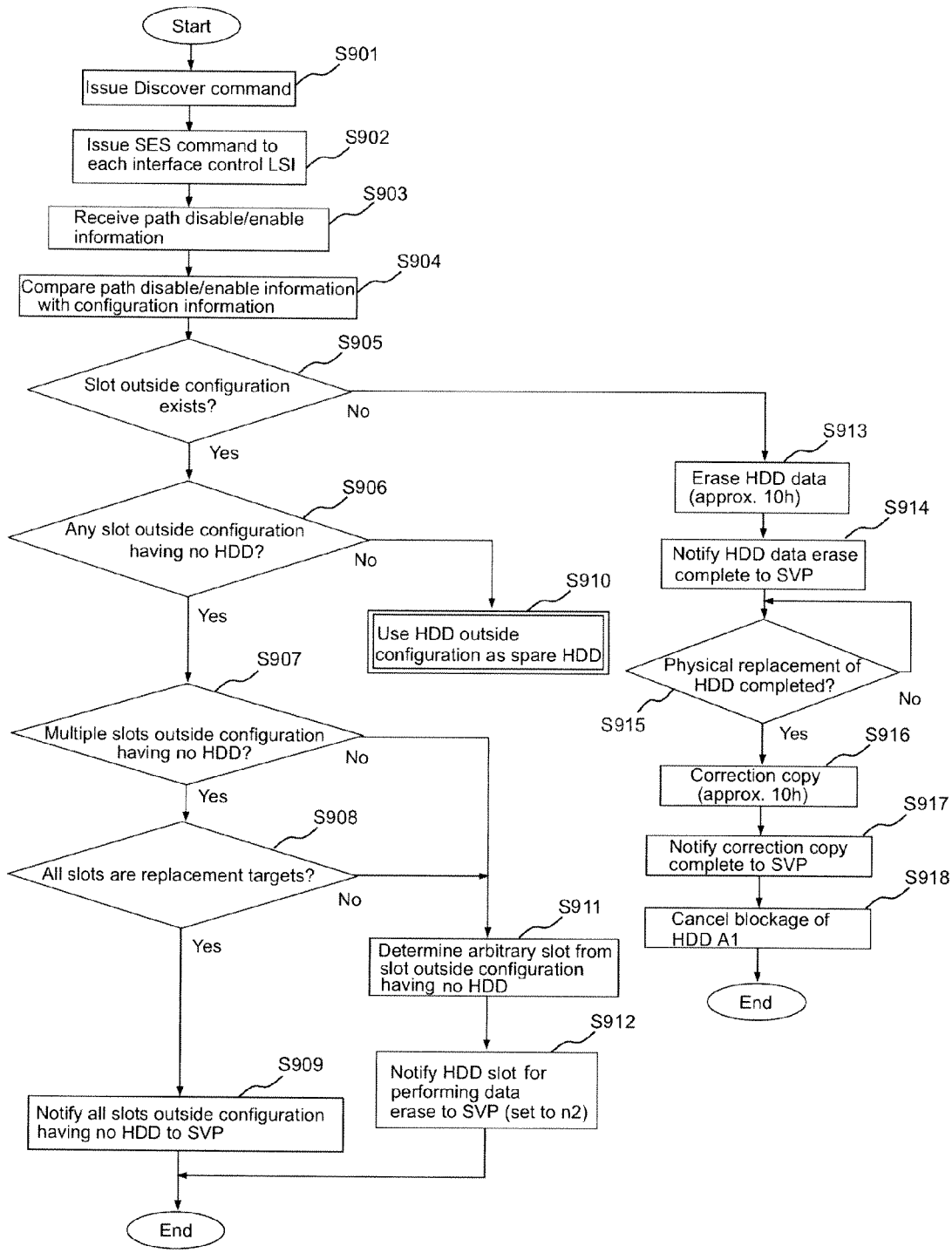
FIG. 9 is a flowchart illustrating the free slot detection processing outside the configuration not using the Present signal.
Figure 10A:
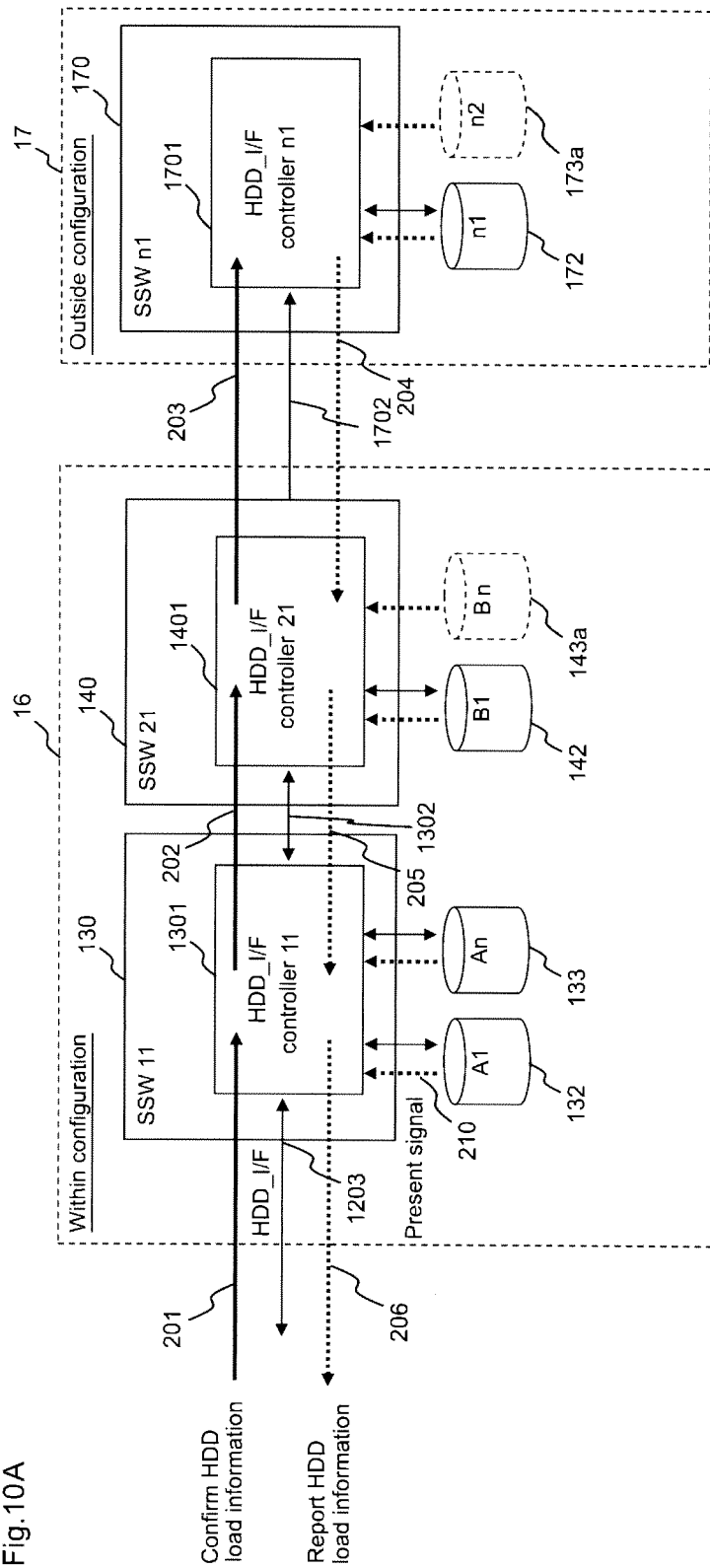
FIG. 10A is a schematic view illustrating the acquisition of HDD load information.

FIG. 8 is a flowchart illustrating the process for detecting a free slot outside the device configuration using a Present signal. FIG. 9 is a flowchart illustrating the process for detecting a free slot outside the device configuration that does not use a Present signal. FIG. 10A is a schematic view illustrating how the HDD load information is obtained. FIG. 10B is an HDD configuration information management table for managing the configuration information of the HDD prior to acquiring the load information. FIG. 10C is a view showing the status of the HDD configuration information management table after acquiring the load information. FIG. 10D is a Present signal table of HDD_I/F controller.

Next, the process for detecting the HDD outside the device configuration will be described with reference to FIG. 8 and FIGS. 10A through 10D. At first, the MP issues a Discover command to the HDD (HDD_A1 132, HDD_n1 172 and so on) group via the HDD_I/F controller 11 1301, HDD_I/F controller 21 1401 and HDD_I/F controller n1 1701 (S801 of FIG. 8). The Discover command is a SAS standard command, which is issued to all the devices belonging to the initiator (MP in the present case), and each device responds the aforementioned SAS address information. Through use of the Discover command, the MP as initiator can acquire the SAS address of all the HDDs both within the configuration and outside the configuration of the storage sub-system 10.

Next, the MP issues an SES command as HDD load information confirmation request to each HDD_I/F controller, by which the command (request) is transmitted sequentially via pathways 201, 202 and 203 of FIG. 10A, for example (S802). In response to the HDD load information confirmation request, each HDD sends an HDD load information to each HDD_I/F controller (status information of Present signal), and each HDD_I/F controller sends the HDD load information sequentially as HDD load information report 204, 205 and 206 to the MP, according to which the MP acquires the HDD load information (S803). Further, the SES command is also a SAS standard command, which is used here to acquire the register information within the HDD_I/F controller.

During normal use of the storage sub-system 10, the devices outside the configuration is not used, so the MP does not issue an SAS standard command such as a SES command to the HDD_I/F controller outside the configuration. However, according to the present invention as described above, the SES command is issued even to the HDD_I/F controller arranged outside the configuration so as to acquire in advance the SAS address information and the load information of all devices including those outside the configuration. Therefore, as shown in FIG. 10A, the arrangement enables the SES command to be issued even to the HDD_I/F controller outside the configuration and to acquire the Present signal of the HDD outside the configuration.

FIG. 10B is a HDD configuration information management table for managing the configuration information of the HDD prior to acquiring the load information. The HDD/slot information 10001 of the HDD configuration information management table 1000 prior to acquiring the HDD load information only includes the information of the HDD within the configuration related to HDD_A1, An, B1 and Bn, so that information only exists in configuration information 10002, status 10003 and SAS address 10004 corresponding to those HDDs, and the columns of Present signal information 10005 and load confirmation information 10006 are blank with no information stored therein. The HDD/slot information 10001 assigns numbers for discriminating HDD bodies and slots in which HDDs are inserted and coupled. In the present drawing, for example, HDD/slot information 10001 "A1" shows that the HDD number and the slot number are the same "A1". If the HDD number differs from the slot number, as described later (FIG. 12B), it is shown as "A1+/A1" (left number: HDD number, right number: slot number).

With respect to FIG. 10B, FIG. 10C is a view showing the HDD configuration information management table 1001 after acquiring the load information. That is, by the MP executing the processes from steps S801 to S803 of FIG. 8, the MP can acquire the HDD load information from the respective HDD_I/F controller. Using the acquired HDD load information, the MP updates the HDD configuration information management table. The updated result is the HDD configuration information management table 1001 after acquiring HDD load information as shown in FIG. 10C. The HDD configuration information management table 1001 newly acquires and manages the information of slots n1 and n2 outside the configuration. Further, the Present signal information having been acquired is also managed similarly. The status information of the Present signal is acquired by the MP in the Present signal table 1002 of FIG. 10D, and the information is stored in the HDD configuration information management table.

FIG. 10D shows the status of an internal resister of a HDD_I/F controller number 10021 corresponding to the HDD slot number 10022. For example, the HDD_I/F controller number coupled to HDD slot number "A1" is "11" and "12", and since the HDD is loaded in slot A1, the Present signal information will be "1".

Similarly, the number of the HDD_UF controller coupled to HDD slot number "Bn" within the configuration is "21" and "22", and since no HDD is loaded in slot Bn, the Present signal information will be "0". The HDD slot numbers "n1" and "n2" outside the configuration are managed similarly as those within the configuration. The slot information and the Present signal information are reflected in the HDD/slot information 10001 and the Present signal information 10005 of FIG. 10B, and the table of FIG. 10C is acquired.

Further, in the HDD configuration information management table 1001 after acquiring the load information of FIG. 10C, the configuration information in the column of added HDD/slot information 1001 "n1" and "n2" is "null". This means that slots n1 and n2 are outside the configuration. In the column of Present signal information 10005, the slot n1 is "1" (HDD is loaded) and slot n2 is "0" (HDD is not loaded).

We will now return to FIG. 8. After acquiring the HDD load information in step S803, the HDD load information is compared with the configuration information of the storage sub-system 10 (S804). That is, the state of the HDD configuration information management table 1000 prior to acquiring the load information of FIG. 10B is compared with the state of the HDD configuration information management table 1001 of FIG. 10C. As a result of the comparison, MP determines whether slots exist outside the configuration or not (S805). If there is no slot outside the configuration (No in S805), the aforementioned HDD data erase and correction copy (with reference to FIG. 5) are performed sequentially in the same slot (S813 to S818).

If a slot exists outside the configuration (Yes in S805), the MP determines whether a slot having no HDD loaded thereto exists outside the configuration (S806). If the MP determines that there is no slot in which HDD is not loaded outside the configuration (No in S806), the MP uses the HDD in the loaded state outside the configuration (the HDD loaded in slot n1 in FIG. 10C) as the spare HDD and the HDD data erase and correction copy described in steps S711 to S715 of FIG. 7A are performed simultaneously in parallel.

If the MP determines that a slot exists outside the configuration in which HDD is not loaded (Yes in S806), the MP determines whether there are multiple slots outside the configuration in which HDD is not loaded (S807). If it is determined that there are not multiple slots outside the configuration in which HDD is not loaded (No in S807), the MP executes step S811. That is, the only slot outside the configuration in which no HDD is loaded is determined as the corresponding slot.

If it is determined that there are multiple slots outside the configuration in which HDD is not loaded (Yes in S807), the MP determines whether all the slots should be set as the replacement target or not (S808). If all the slots are not to be set as the replacement target (No in S808), the MP executes step S811. In step S811, the MP determines an arbitrary single slot out of the slots outside the configuration having no HDD loaded thereto, and notifies the HDD slot information (such as slot n2 in FIG. 10C) for executing data erase to the SVP 416 (S812). If all the slots are set as the target of replacement (Yes in S808), the MP notifies all the slot information outside the configuration having no HDD loaded thereto (S809).

As described in step S811, if there are multiple slots outside the configuration in which HDD is not loaded, an arbitrary single slot is selected and fixed so that the MP should only perform load confirmation to the only fixed slot and the process is facilitated. Another merit is that the risk of erroneously performing the HDD data erase processing performed thereafter can be prevented.

Furthermore, as shown in step S809, it is possible to notify to the SVP 416 all the slots outside the configuration in which HDD is not loaded as slots capable of performing data erase. According to this method, the process on the MP side is somewhat increased, but since the maintenance crew or the user can easily insert an HDD to any arbitrary slot out of the designated slots to perform data erase, the maintenance is facilitated and the maintenance performance is enhanced.

Moreover, in the processing for detecting a free slot outside the configuration of FIG. 8, whether an HDD is loaded or not is determined based on the Present signal (HDD load information), but as shown in FIG. 9, the status can be determined based on a disable/enable status of the path between the HDD_UF controller and the HDD through which the SES command is notified (which is enable when HDD is loaded and disable when HDD is unloaded), and the status information can be stored in the HDD configuration information management table instead of the Present signal for management.

The differences between FIG. 8 and FIG. 9 are that in step S903 the MP receives the disable/enable status information of the path between the HDD_UF controller and the HDD instead of in step S803 in which the MP receives the HDD load information, and that in step S904 the disable/enable status information of the path is compared with the configuration information instead of in step S804 in which the HDD load information is compared with the configuration information of the storage sub-system 10.

If a slot outside the configuration does not exist, there is no other way than to perform the HDD data erase and correction copy in the same slot as mentioned earlier (FIG. 5). However, if a slot outside the configuration exists but all the slots have HDD loaded thereto, it is possible to perform a process using the HDD outside the configuration as a spare HDD. The present process will be described in detail later.

As described, according to the present HDD replacement method, the correction copy processing and the data erase processing can be performed simultaneously, and the time required to recover from failure can be shortened while reducing the risk of information leakage. Furthermore, by using a free slot outside the configuration to erase the data of the failure HDD and to load the spare HDD in the original slot in which the failure HDD has been inserted to perform correction copy, the spare HDD can be used in the same insertion position after failure recovery and the logical position and the physical position of the HDD will not be displaced. For example, if HDDs constituting the same RAID group are aligned in a row at the time of installation, the HDDs constituting the RAID group will still be arranged in a row after failure recovery, and it becomes possible to prevent occurrence of a state in which only one HDD is loaded at a distant position. Thereby, during maintenance, the maintenance crew can easily comprehend the group of HDDs constituting RAID groups and maintenance mistakes such as erroneous replacement of a HDD can be obviated. As described, according to the present HDD replacement method, the replacement operation of the failure HDD and the spare HDD prior to performing the correction copy processing and the data erase processing becomes unnecessary. Therefore, the correction copy processing and data erase processing can be performed by the instruction from the maintenance center without having a maintenance crew stand by, and the HDD replacement operation and the retrieval of the failure HDD can be performed after completing the process, so that the maintenance can be simplified.

<Load Confirmation Processing of Failure HDD and Spare HDD>

Figure 11A:
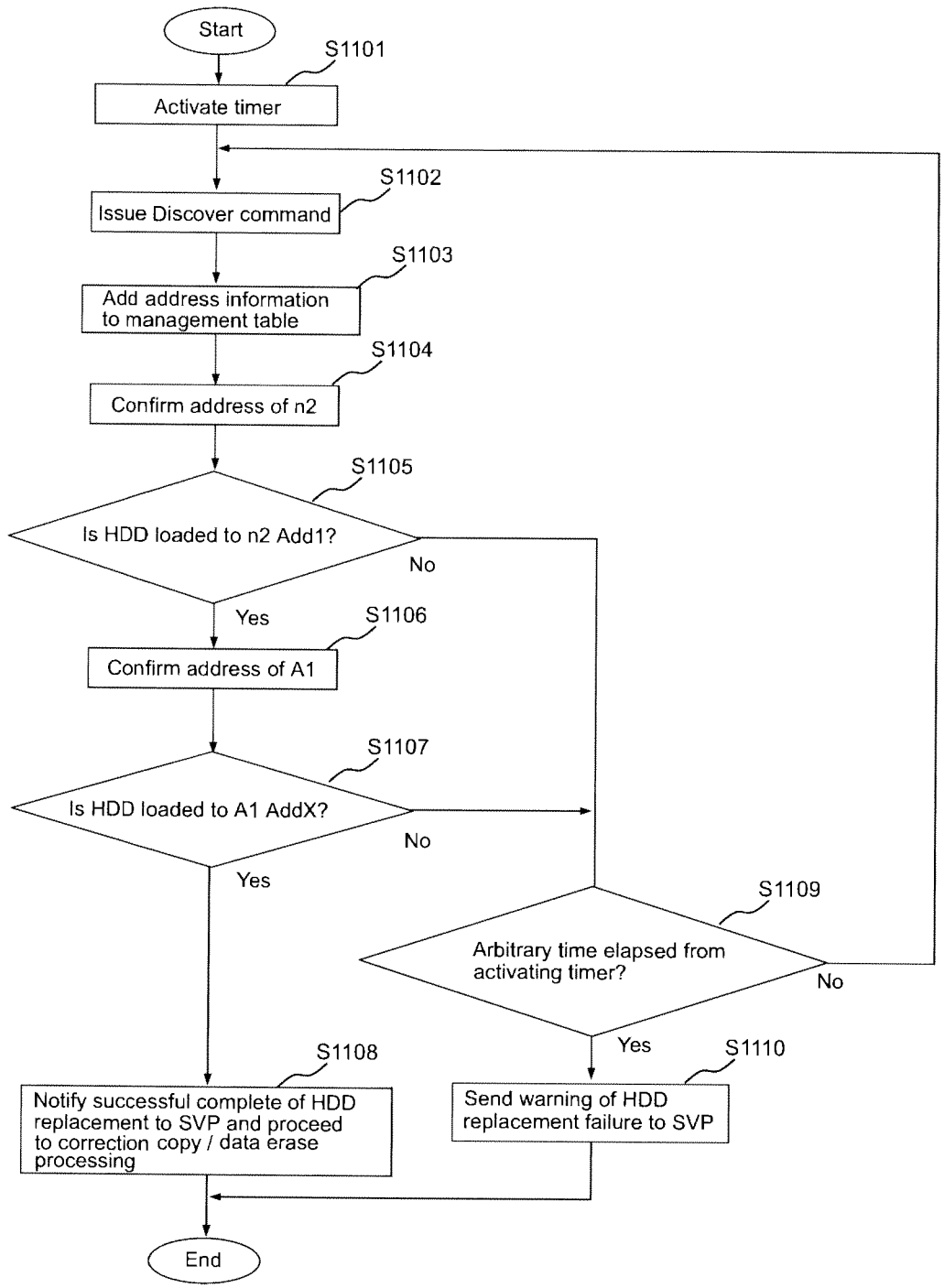
FIG. 11A is a flowchart illustrating a load detection processing of the failure HDD and the spare HDD.

FIG. 11A is a flowchart for illustrating a load detection processing of failure HDD and spare HDD. FIG. 11B is a view showing the state of the HDD configuration information management table prior to loading the failure HDD and the spare HDD. FIG. 11C is a view showing the state of the HDD configuration information management table after loading the failure HDD and the spare HDD.

Next, the load confirmation processing (HDD replacement operation) of the failure HDD and the spare HDD will be described with reference to FIGS. 11A through 11C. At first, the MP activates a timer as a timekeeping means prior to executing the detection processing (S1101 of FIG. 11A). Next, the MP issues a Discover command so as to acquire an SAS address from all the coupled storage devices (S1102). When the MP issues the Discover command, the information of all storage devices (such as HDDs and SSDs having a SAS OF protocol) are returned regardless of whether the device is within the configuration or outside the configuration.

In normal processing, the MP abandons the HDD information outside the configuration. However, according to the present processing, the MP adds not only the SAS address information within the configuration but also the SAS address information of the HDD outside the configuration to the HDD configuration information management table 1101 (S1103) as in the HDD configuration information management table of FIG. 11B ("Add4" of SAS address information 10004 where HDD/slot information 10001 is "n1").

Next, the MP confirms the SAS address information of slot n2 via the HDD configuration information management table 1101 (S1104). At the present time point, only the HDD of slot A1 is blocked, and the blocked HDD has not yet been removed from slot A1 to be inserted to slot n2. Therefore, the SAS address information of slot A1 is still "Add1", and the SAS address information of slot n2 is still vacant. In other words, it can be seen from the configuration information management table 1101 of FIG. 11B that slot A1 still loads the failure HDD and slot n2 does not have any HDD loaded thereto. In this state, it is not possible to start the process of data erase of the failure HDD and the correction copy of the spare HDD.

Then, the MP confirms whether the SAS address of the HDD loaded to slot n2 is information "Add1" (data delete target HDD (failure HDD)) stored in the load confirmation 10006 of the HDD configuration information management table 1101 (step S1105). As described earlier, since the data erase target HDD (SAS address "Add1") is not loaded in slot n2 (No in S1105), step S1109 is executed.

Thereafter, it is determined whether a predetermined time has elapsed from starting the timer in step S1101 (S1109). If a predetermined time has not yet elapsed (when the time is within an allowable maintenance time) (No in S1109), the MP re-executes the processes of step S1102 and subsequent steps. If a predetermined time has elapsed (Yes in S1109), the MP determines that the replacement of the HDD has failed due to some cause and sends a warning to the SVP 416 (S1110).

If the replacement of the HDD has been completed without fail, the state of the HDD configuration information management table 1101 shown in FIG. 11B is changed to the state of the HDD configuration information management table 1102 shown in FIG. 11C. Actually, the SAS address information 10004 of HDD slot A1 is changed from "Add1" (SAS address information of failure HDD) to "Add5" (SAS address information of spare HDD), and the SAS address information 10004 of HDD slot n2 is changed from vacant to "Add1" (SAS address information of failure HDD).

Therefore, when the MP re-executes the process of step S1102 and subsequent steps, the steps from S1104 to S1108 are performed. In other words, the MP executes confirmation of the SAS address of the HDD loaded in slot n2 (S1104), determination on whether the confirmed SAS address is "Add1" (S1105), and confirmation of the SAS address of the HDD loaded in slot A1 (S1106). Thereafter, the MP executes determination (S1107) on whether the confirmed SAS address is "AddX" (wherein X is an arbitrary value other than "1", which is "5" in the present example) (S1107), and determines whether the HDD replacement has been completed successfully. If the MP determines that HDD replacement has been completed successfully (Yes in S1107), the result is notified to the SVP 416, and the procedure advances to the routine of executing data erase and correction copy (S1108).

The above description used the SAS address to confirm the HDD, but the HDD can be specified using values and information unique to the HDD, such as the HDD serial number. For example, the HDD serial number can be acquired by the MP issuing an Inquiry command and receiving the inquiry information from the HDD. By comparing the HDD serial number information of the failure HDD and the replaced (added) HDD similar to the SAS address, it becomes possible to confirm that the HDD is the same.

Regarding the point that the failure HDD is removed once from the storage sub-system 10 prior to performing data erase, it may be possible that the replacement operation is completed without having the HDD data deleted or the HDD may be taken out of the facility. This problem can be prevented by only enabling the storage sub-system 10 to be recovered to normal status when the failure HDD is confirmed to be loaded to the HDD slot outside the configuration for data erase, according to which maintenance mistakes can be suppressed, maintenance performance can be improved, and security can be improved.

According to the HDD replacement processing of FIGS. 8, 9 and 11A, the maintenance performance can be improved by changing the LED lighting status according to the HDD status shown in FIG. 7B and notifying the HDD status to the maintenance crew or the user. Especially during data erase or data erase complete, the status differs from normal operation, so that the LED lighting is set to a state not seen during normal operation of the storage sub-system 10, such as orange light on or orange light flickering, so that the recognition performance is enhanced and maintenance can be facilitated.

As described, a new HDD (spare HDD) is inserted to the slot in which the failure HDD has been previously inserted to perform correction copy, and the failure HDD can be inserted to a free slot for data erase.

According to a method other than the present method, it is possible to register a spare HDD in advance to the configuration and to use the HDD as spare HDD when failure occurs. However, if a spare HDD is registered in advance to the configuration, the number of HDDs that can be used is reduced corresponding to the number of the spare HDDs, so that the storage capacity of the storage sub-system 10 capable of being used by the user is reduced.

Moreover, all the HDD types (type (FC/SAS/SATA and the like) and capacity (1 TB/2 TB and so on)) used by the storage sub-system 10 must be prepared as spare HDDs. Even further, though the spare HDD is normally unused but power must always be fed thereto, the life of the HDD is gradually reduced little by little even before the HDD is actually used as spare. Additionally, the maintenance performance is deteriorated by having the spare HDD loaded in a slot different from the configuration information of the storage sub-system 10.

However, according to the present method, a spare HDD is newly loaded when failure occurs, so that the problems of the above method such as the reduction of storage capacity, the loading of various types of HDD, the reduction of lifetime and the deterioration of maintenance performance can be solved.

<Process for Using HDD Outside the Device Configuration as Spare HDD>

Figure 12A:
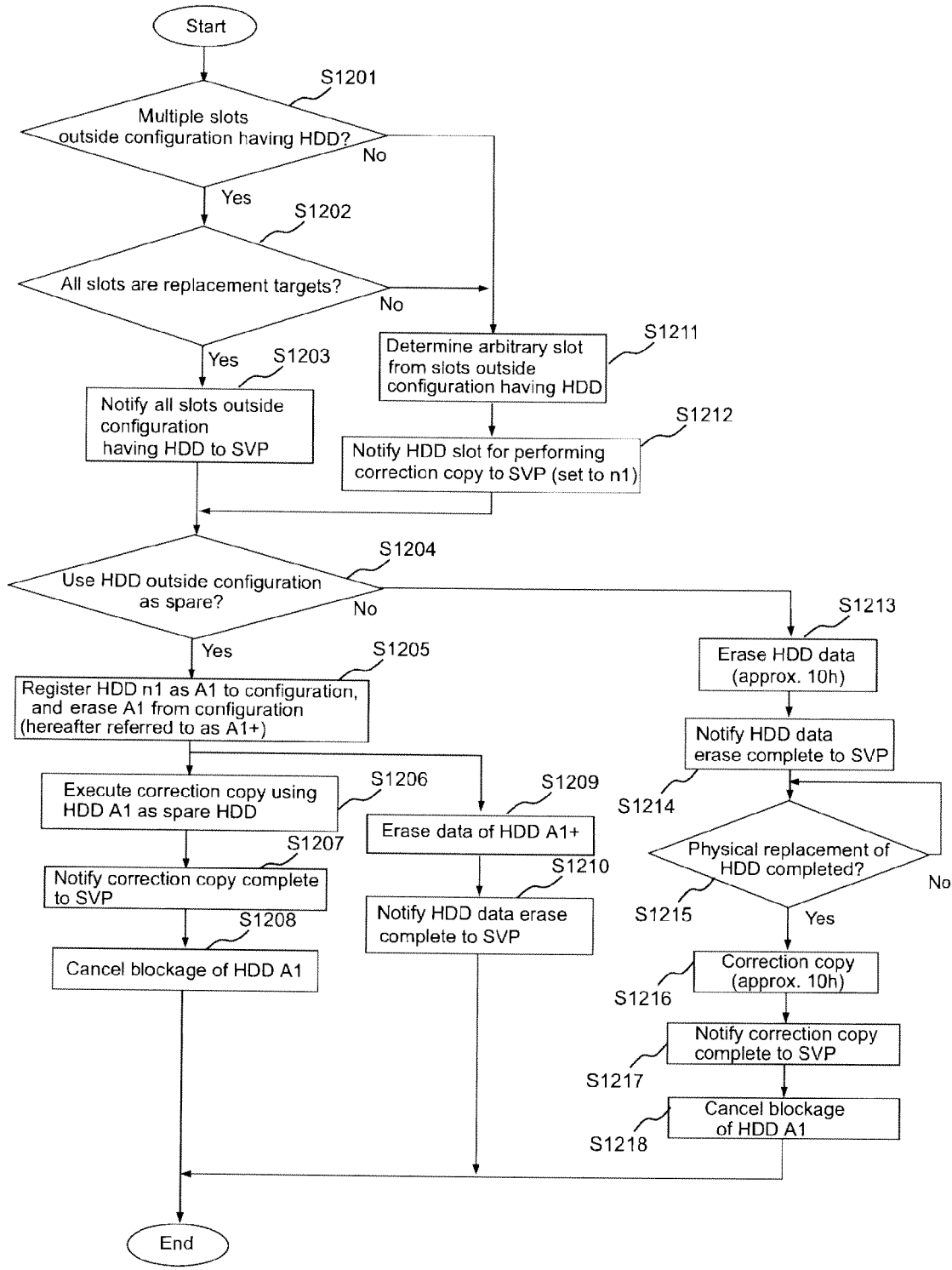
FIG. 12A is a flowchart illustrating the data erase and correction copy processing when the HDD outside the configuration is used as the spare HDD.
Figure 13A:
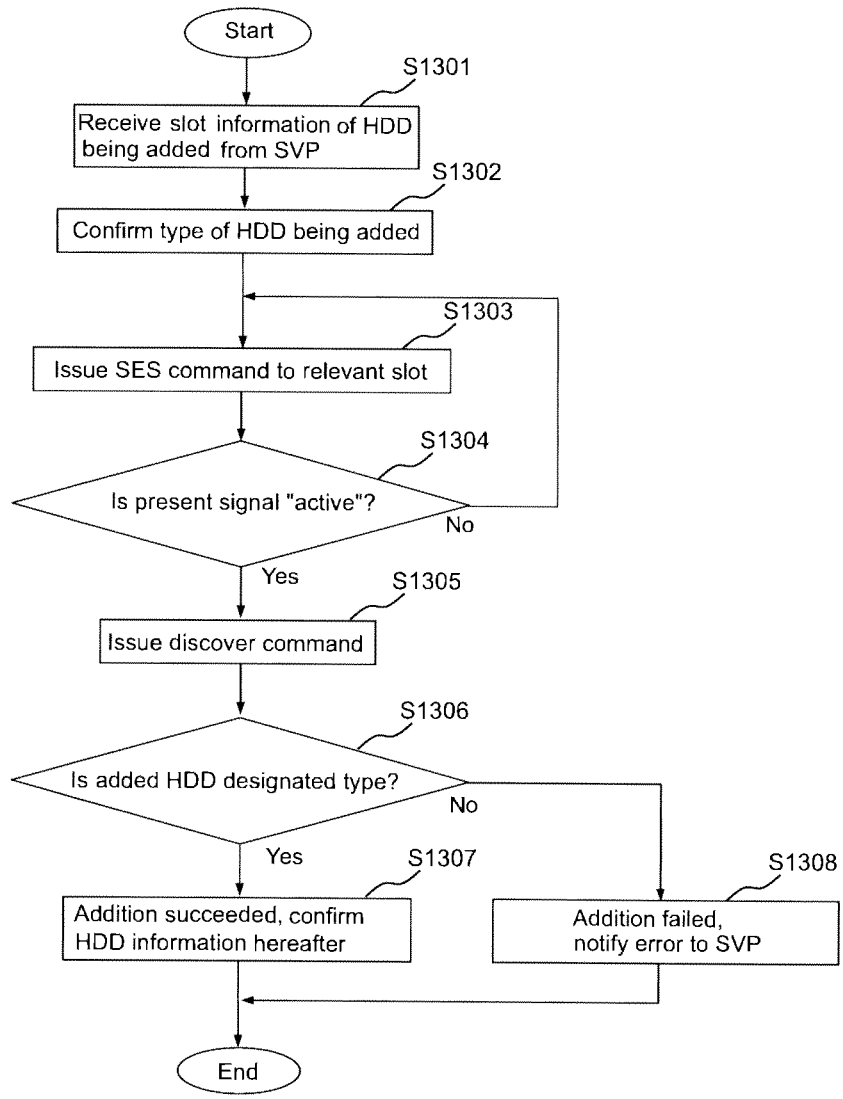
FIG. 13A is a flowchart illustrating the processing for adding an HDD.

FIG. 12A is a flowchart showing a data erase and correction copy processing when the HDD outside the configuration is used as the spare HDD. FIG. 12B is a view showing the status of the HDD configuration information management table when the HDD outside the configuration is used as the spare HDD. FIG. 13A is a flowchart describing the process of adding an HDD.

Next, the process for using the HDD outside the configuration as spare HDD to replace the storage device will be described with reference to FIGS. 12A and 12B. The outline of the present method is, as shown in the HDD configuration information management table of FIG. 12B, when it is detected that an HDD is loaded to the HDD slot outside the configuration (such as slot n1), a notice is sent to the SVP 416 that the HDD_n1 loaded in slot n1 can be used as the spare HDD.

Next, when the HDD_n1 is to be used as spare HDD, the MP newly registers the HDD_n1 as HDD_A1 to the configuration, removes the failure HDD having been originally registered in the configuration from the configuration, and temporarily sets the failure HDD as HDD_A1+ (FIG. 12B). The HDD_A1+ is not removed from the original HDD slot A1, and data erase is performed in that manner. Thereby, it becomes possible to simultaneously perform correction copy of the spare HDD (new HDD_A1 loaded in slot n1) and data erase of the failure HDD (HDD_A1+ loaded in slot A1).

After correction copy and data erase are completed, the failure HDD (HDD_A1+) having data erased therefrom loaded in slot A1 can be removed and brought back to the maintenance center. At this time, it is also possible to have the slot A1 remain as an unloaded slot outside the configuration or to have a new HDD inserted thereto and set as a loaded slot outside the configuration.

Further, it is also possible to pull out the HDD of slot n1 having completed correction copy and to insert the same to the vacant slot A1 so that the device configuration information of storage sub-system 10 after failure recovery corresponds to that prior to occurrence of failure. Actually, the MP detects a slot outside the configuration in which HDD is loaded using the HDD configuration information management table as show in steps S801 through S806 of FIG. 8 or processing steps S901 through S906 of FIG. 9. In that case, as shown in the HDD configuration information management table of FIG. 12B, the Present signal 10005 of HDD slot n1 outside the configuration is "1", so that the HDD is mounted in the slot and the SAS address is "Add4".

Next, the MP determines using the HDD configuration information management table whether there are multiple slots in which the HDD is loaded outside the configuration or not (S1201). If it is determined that there are no multiple slots outside the configuration in which the HDD is loaded (No in S1201), the MP executes step S1211. That is, it is determined that the only slot outside the configuration to which the HDD is loaded is determined as the corresponding slot. If it is determined that there are multiple slots outside the configuration in which HDD is loaded (Yes in S1201), the MP determines whether all the slots should be set as replacement target or not (S1202). The existence of multiple slots outside the configuration in which HDD is loaded can be recognized by the Present signal 10005 being "1" in slots n1, n3 and nn, the existence of the SAS 10004 and the status of "HDD loaded" in the HDD configuration information management table.

When all the slots are not set as replacement target (No in S1202), the MP executes step S1211. In step S1211, the MP determines an arbitrary single slot from the multiple slots outside the configuration in which HDD is loaded (S1211), and the slot information (such as slot n2 in FIG. 12B) for performing data erase is notified to SVP 416 (S1212). When all slots are set as replacement target (Yes in S1202), the MP notifies all the slot information outside the configuration in which HDD is loaded to the SVP 416 (S1204).

Next, the MP determines whether the HDD outside the configuration should be used as spare HDD or not (S1204). If the HDD outside the configuration is not used as the spare HDD (No in S1204), the processes of steps S1213 to S1218 are executed. Further, the present processing is the same as the processing of steps S507 to S512 shown in FIG. 5, so the descriptions thereof are omitted.

When the HDD outside the configuration is used as the spare HDD (Yes in S1204), the MP registers the HDD_n1 outside the configuration as new HDD_A1 to the configuration, deletes the configuration registration of the failure HDD_A1, and refers to the HDD as HDD_A1+ (S1205). Next, the MP performs correction copy to the new HDD_A1 in steps S1206 and S1207 and simultaneously performs data erase of failure HDD_A1+ in steps S1209 and S1210 simultaneously in parallel. After completing correction copy and data erase, the MP cancels the blocked status of HDD_A1 (S1208). Further, the processes from S1205 through S1210 and the processes from S1213 through S1218 can be performed in the background while performing normal processes such as the processing of write requests or read requests from the host 30.

As described, it becomes possible to perform correction copy and data erase in parallel using the HDD outside the configuration as the spare HDD. Further, the maintenance operation such as the replacement of the HDD by the maintenance crew or the user can be performed in a short time after completing the processing in the storage sub-system 10, so that the maintenance time can be shortened. Moreover, since the physical slot position information is not changed, the physical position of the replaced HDD is also easily comprehended easily in SVP 416, so the maintenance performance is enhanced.

It has been stated in the aforementioned description that when there are multiple slots outside the configuration in which HDD exists, there are two ways to cope with the situation, to notify an arbitrary single slot to the SVP 416 from the MP or to notify multiple slots. According to the method in which a single slot is fixed, the MP should only perform confirmation on whether the HDD is loaded or not to the fixed slot, so that the processing is simplified, and since the slot in which data erasing process is performed is the same slot in which the failure has occurred, the risk of performing erroneous erasing operation in a different slot can be prevented.

On the other hand, according to the method in which a plurality of slots are used, the processing of the MP is somewhat increased, but since the maintenance crew or the user can arbitrarily select a slot that seems to facilitate maintenance operation (such as a free slot outside the configuration which is physically close to the physical HDD), the maintenance performance can be enhanced.

<Processing During Addition of HDD>

FIG. 13A is a flowchart illustrating the process performed during addition of an HDD. FIG. 13B is a view showing the status of the HDD configuration information management table after addition of the HDD.

Next, the processing performed during addition of the HDD will be described with reference to FIGS. 13A and 13B. According to the overall outline of the processing, the identifier of the HDD having been added via the SVP 416 is entered. Thereafter, when the HDD is inserted, it is determined whether the entered HDD information corresponds to the detected HDD information.

Actually, at first, the MP receives the slot information of the being added HDD (such as the slot number, the being added HDD type, capacity, SAS address and serial number) from the SVP 416 (S1301). Here, the temporary slot number is set to "f1". Thereafter, the MP confirms the type of the being added HDD by the received slot information (such as the type, capacity, SAS address and serial number) (S1302).

Next, the MP issues an SES command via the DKA_I/F controller and HDD controller to the relevant slot (S1303). Thereafter, the MP acquires the status of the Present signal via the HDD_I/F controller and the DKA_I/F controller, and determines whether the signal is "Active" (S1304). Even if the HDD is loaded in the predetermined slot, it will not immediately enter a ready status in which normal access is enabled. Therefore, the MP issues an SES command and confirms the status of the Present signal until the HDD enters a ready status. In other words, if the Present signal status is not "Active" (No in S1304), step S1303 is re-executed.

If the Present signal status is "Active" (Yes in S1304), the MP issues a Discover command and acquires the device information of the added HDD (S1305). The MP compares the acquired device information with the information of the HDD type entered via the SVP 416, and if they correspond (Yes in S1306), it notifies addition has succeeded to the SVP 416, confirms the status of the HDD, and updates the HDD configuration information management table as shown in FIG. 13B. In other words, the configuration information 10002 of slot c1 is updated to "yes", the status 10003 is updated to "HDD loaded", the SAS address 10004 is updated to "Add10", and the Present signal information 10005 is updated to "1". If the acquired device information does not correspond to the entered HDD type information (No in S1306), an error report notifying that the addition has failed is sent to the SVP 416 and the process is ended.

According to the above processing, an HDD can be added within the device configuration. Further, the adding of an HDD outside the configuration can be performed similarly, wherein the difference thereof from the process to add an HDD within the configuration is that the configuration information of the HDD configuration information management table is "yes" or "no".

As described, according to the present invention, erasing of data of the failure HDD can be performed within the facility in which the storage sub-system is disposed and the data erase can be performed independently from and in parallel with the recovery processing of the storage sub-system such as correction copy. Therefore, the present invention enables to prevent the occurrence of a risk such as data loss caused by the time required to perform data erase and deterioration of data assurance property.

Moreover, even if the capacity of HDD is further increased along with the advancement of high density recording technology, only the data erase time is elongated, and the occurrence of risks such as data loss and deterioration of data assurance property can be prevented similarly. Furthermore, by erasing the HDD data in the background of normal operation of the storage sub-system, it is not necessary for the maintenance crew or the user to constantly stand by near the storage sub-system.

Further, it is possible to reduce or eliminate the number of spare HDDs to be loaded in advance, and it is also possible to reduce the operation of replacement of the failure HDD and the spare HDD (operation to change the physical position) which was necessary prior to or during executing of correction copy and data erase processing. In addition, since the physical position and the logical position of the HDDs are close, erroneous erasing and other operational misses can be reduced. Moreover, since the storage devices can be replaced by the operator at the maintenance center sending a simple instruction to the maintenance crew or general user not having much specialized knowledge at the site, it becomes possible to reduce maintenance time and improve maintenance property via operator maintenance.

According to the above description, the HDD was shown as the example of the storage device, but the present invention is not restricted thereto, and the present invention can be applied to storage devices composed of a nonvolatile semiconductor device such as a flash memory or to storage devices such as re-writable optical disk media.

INDUSTRIAL APPLICABILITY

The present invention can be applied to information processing apparatuses such as general computers and servers, and to storage devices such as storage systems.

REFERENCE SIGNS LIST

10 Storage sub-system
11 Controller unit (cluster 1)
12 Controller unit (cluster 2)
16 Within device configuration
17 Outside device configuration
20 Maintenance center
30 Host
40 Cluster configuration
101 LAN
102 Modem
110, 111 MP
112 Bus
120, 121 DKAPK
130, 131, 140, 141, 170, 171 SSW
132, 133, 142, 143, 143a, 172, 173a HDD
201, 202, 203 HDD load information confirmation request
204, 205, 206 HDD load information report response
400, 410 Controller housing (disk controller (DKC unit))
411 MPPK (MP board)
412 Shared memory board
413 SW board
414 CHAPK
415 DKAPK
416 SVP (Service Processor)
417, 513 Power supply unit
500, 510 Disk unit housing (disk unit (DKU))
501 RAID group management table
511 SSW (SAS Switch)
512 HDD
513 Power supply unit
1000, 1001, HDD configuration information management table
1002 Present signal table
1100 HDD slot status LED lighting table
1101, 1102, 1201, 1301 HDD configuration information management table
1201, 1202, 1211, 1212 DKA_I/F controller
1203, 1213, 1302, 1312 HDD_I/F bus
1301, 1311, 1401, 1411 HDD_I/F controller
1611, 1711 HDD group
1612, 1614, 1615, 1616, 1617 SSW
1618, 1619 ECC group
1620, 1621, 1720, 1721 HDD
1701, 1713 HDD_I/F controller
1702, 1712 HDD_I/F bus
4111 Local shared memory
4121 Shared memory

The invention claimed is:

1. A storage sub-system coupled to a host computer, the storage subsystem comprising:
   a storage device unit having a plurality of storage devices configured to store data from the host computer; and
   a management unit configured to manage the storage device unit;
   wherein the management unit comprises at least one computer that is configured to:
      specify a first slot of a storage device in which failure has occurred;
      specify a second slot that differs from the specified first slot; and
      perform a data recovery processing and a data erase processing of the storage device in which the failure has occurred using the first slot and the second slot; and
   wherein the second slot is a slot determined by the at least one computer of the management unit by sending a load information request to the storage device, acquiring a storage device load information, comparing the storage device load information with a configuration information managed in the storage sub-system, and extracting a slot in an unused status from all slots of the storage subsystem.

2. The storage sub-system according to claim 1, wherein the storage device load information is composed of the slot number and a storage device load information of the slot, a status information of the storage device, and a unique information of the storage device.

3. The storage sub-system according to claim 2, wherein the at least one computer of the management unit is configured to:
   remove the storage device in which the failure has occurred loaded in the first slot and load the same to the second slot;
   load a storage device to the first slot in vacant status;
   execute the data recovery processing to the storage device loaded in the first slot; and
   execute the data erase processing to the storage device in which the failure has occurred loaded in the second slot.

4. The storage sub-system according to claim 2, wherein the at least one computer of the management unit is configured to:
   execute the data erase processing to the storage device in which the failure has occurred loaded in the first slot; and
   execute the data recovery processing to the storage device either already loaded in the second slot or being loaded thereto.

5. The storage sub-system according to claim 2, wherein the unique information of the storage device is either the SAS address information or the serial number of the storage device.

6. The storage sub-system according to claim 2, wherein the unique information of the storage device loaded in the first slot is either the SAS address information or the serial number of the storage device.

7. The storage sub-system according to claim 1, wherein the data recovery processing is performed using the data of the storage device constituting a same RAID group as the storage device of the first slot.

8. The storage sub-system according to claim 1, wherein the storage device in which the failure has occurred is blocked prior to starting the data recovery processing and the data erase processing.

9. The storage sub-system according to claim 1, wherein the storage device in which the failure has occurred is blocked when a number of failures occurring in the storage device is accumulated and the accumulated result becomes greater than a threshold having been determined in advance.

10. The storage sub-system according to claim 1, wherein the at least one computer of the management unit is configured to notify to a management terminal coupled to the storage subsystem one of the following information: a blockage information of the storage device in which the failure has occurred, the second slot information, a storage device load information to the second slot, a data erase complete, data recovery processing complete and storage device removal complete information from the first slot or the second slot, and a storage device load complete information to the first slot or the second slot.

11. The storage sub-system according to claim 10, wherein the at least one computer of the management unit is configured to
send a warning to the management terminal when the loading of the storage device to the first slot or the second slot is not completed within a predetermined time.

12. A storage device replacement method of a storage sub-system coupled to a host computer, the storage sub-system comprising:
a storage device unit having a plurality of storage devices configured to store data from the host computer; and
a management unit comprising at least one computer that is configured to manage the storage device unit;
wherein the method comprises:
specifying, using the at least one computer, a first slot of a storage device in which failure has occurred;
specifying, using the at least one computer, a second slot that differs from the specified first slot;
performing, using the at least one computer, a data recovery processing and a data erase processing of the storage device in which failure has occurred using the first slot and the second slot;
determining, using the at least one computer, the second slot by
sending a load information request to the storage device,
acquiring a storage device load information,
comparing the storage device load information with a configuration information managed in the storage sub-system, and
extracting a slot in an unused status from all slots of the storage subsystem.

13. A storage sub-system coupled to a host computer, the storage subsystem comprising:
a storage device unit having a plurality of storage devices configured to store data from the host computer; and
a management unit configured to manage the storage device unit;
wherein the management unit is configured to:
specify a first slot of a storage device in which failure has occurred;
specify a second slot that differs from the specified first slot; and
perform a data recovery processing and a data erase processing of the storage device in which the failure has occurred using the first slot and the second slot;
wherein the management unit is configured to notify to a management terminal coupled to the storage subsystem one of the following information: a blockage information of the storage device in which the failure has occurred, the second slot information, a storage device load information to the second slot, a data erase complete, data recovery processing complete and storage device removal complete information from the first slot or the second slot, and a storage device load complete information to the first slot or the second slot; and
wherein the at least one computer of the management unit is configured to
send a warning to the management terminal when the loading of the storage device to the first slot or the second slot is not completed within a predetermined time.

* * * * *